Sept. 18, 1956  P. W. SENFLEBEN ET AL  2,763,016
STITCHDOWN LASTING MACHINES
Filed Dec. 13, 1952  15 Sheets-Sheet 1
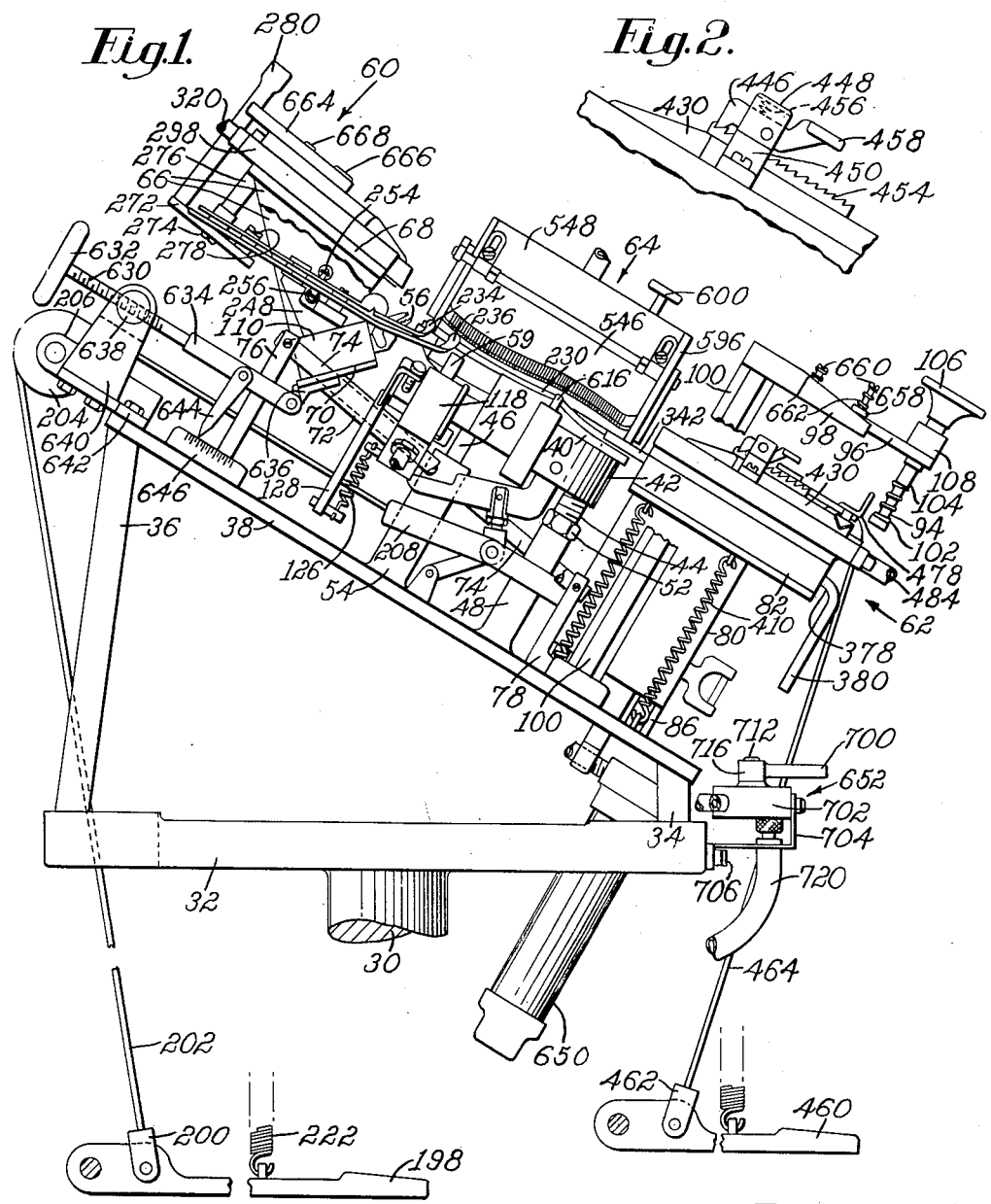
Inventors
Paul W. Senfleben
Charles B. Noonan
By their Attorney
Thomas J. Ryan

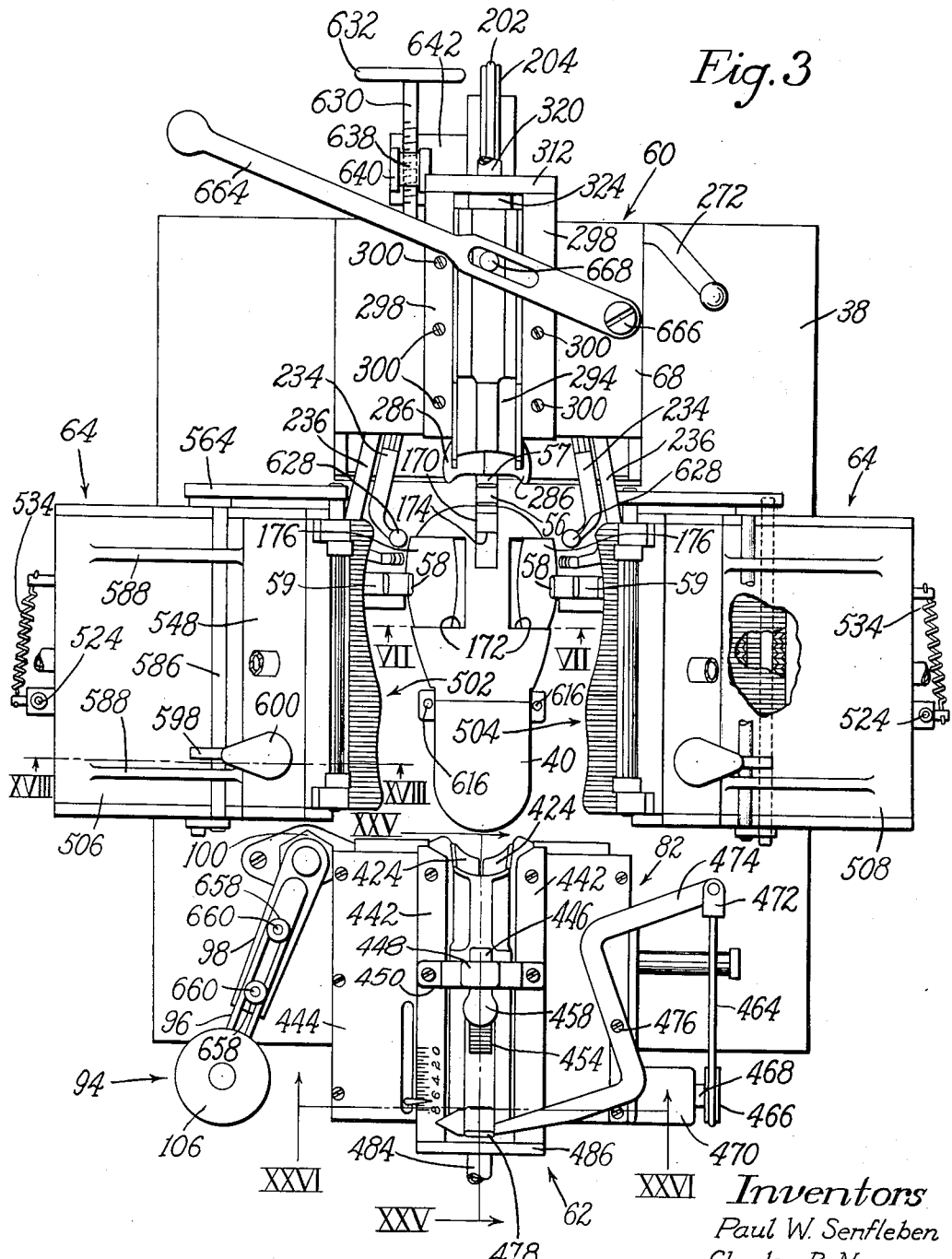

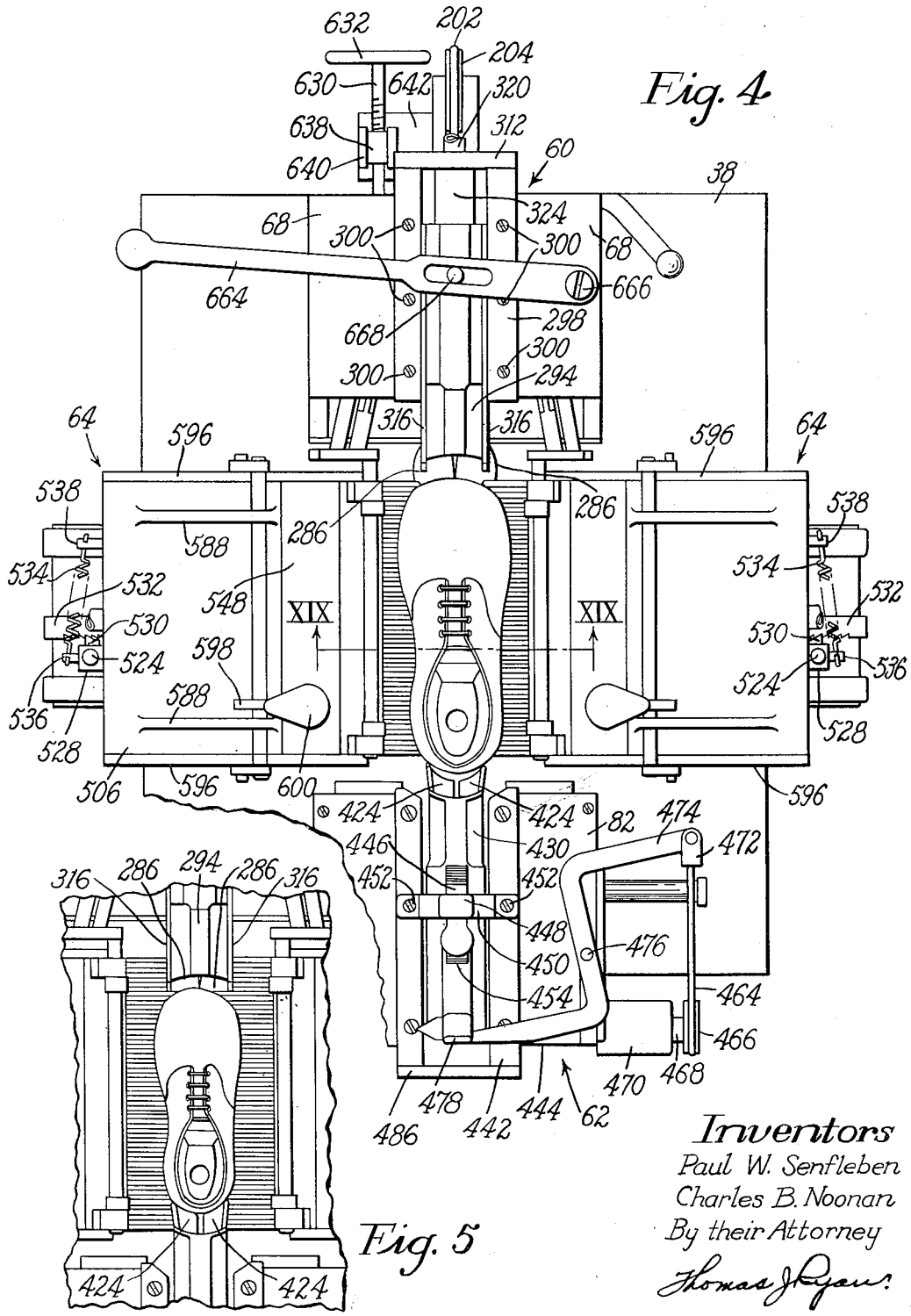

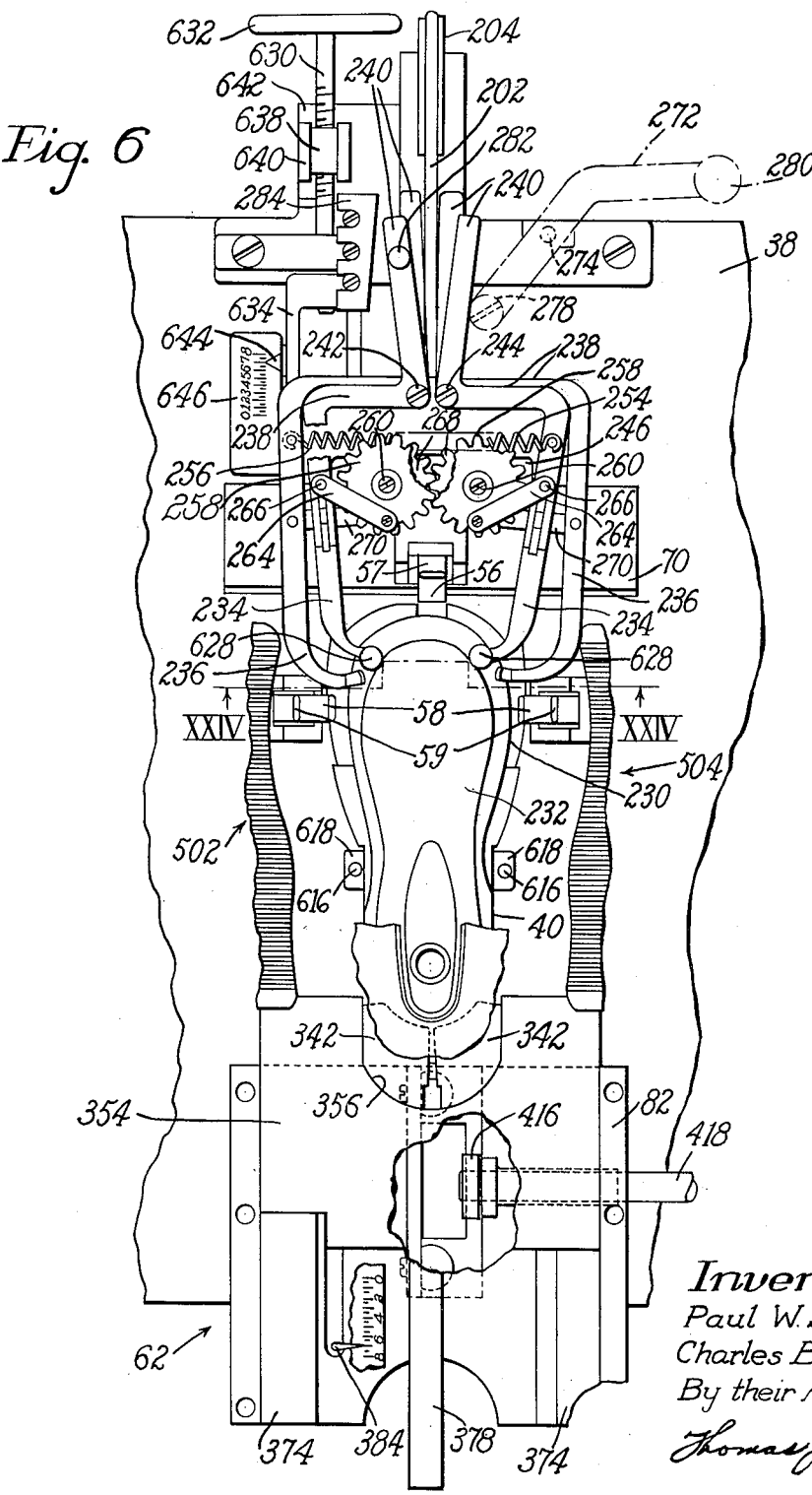

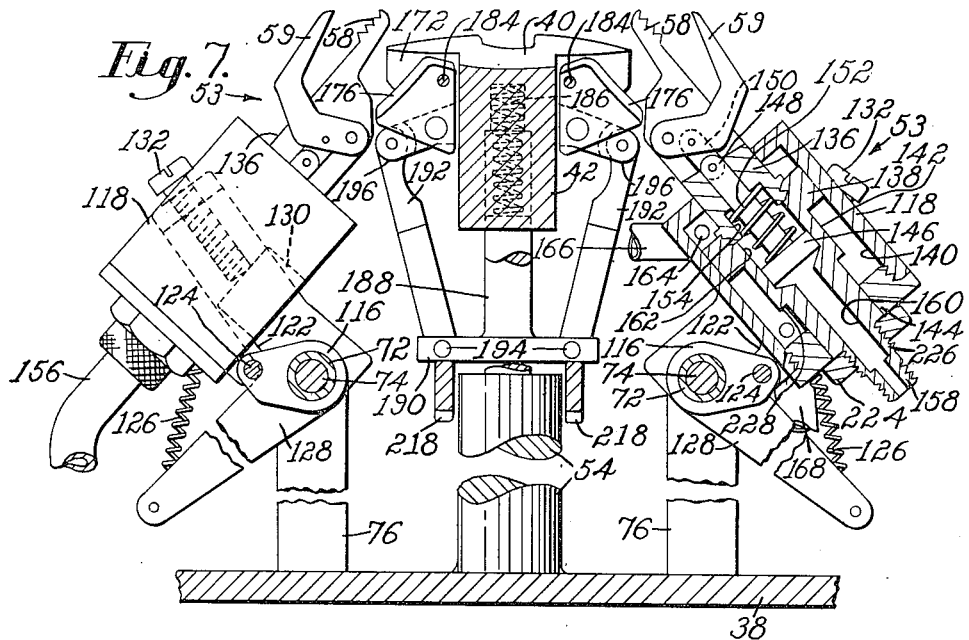

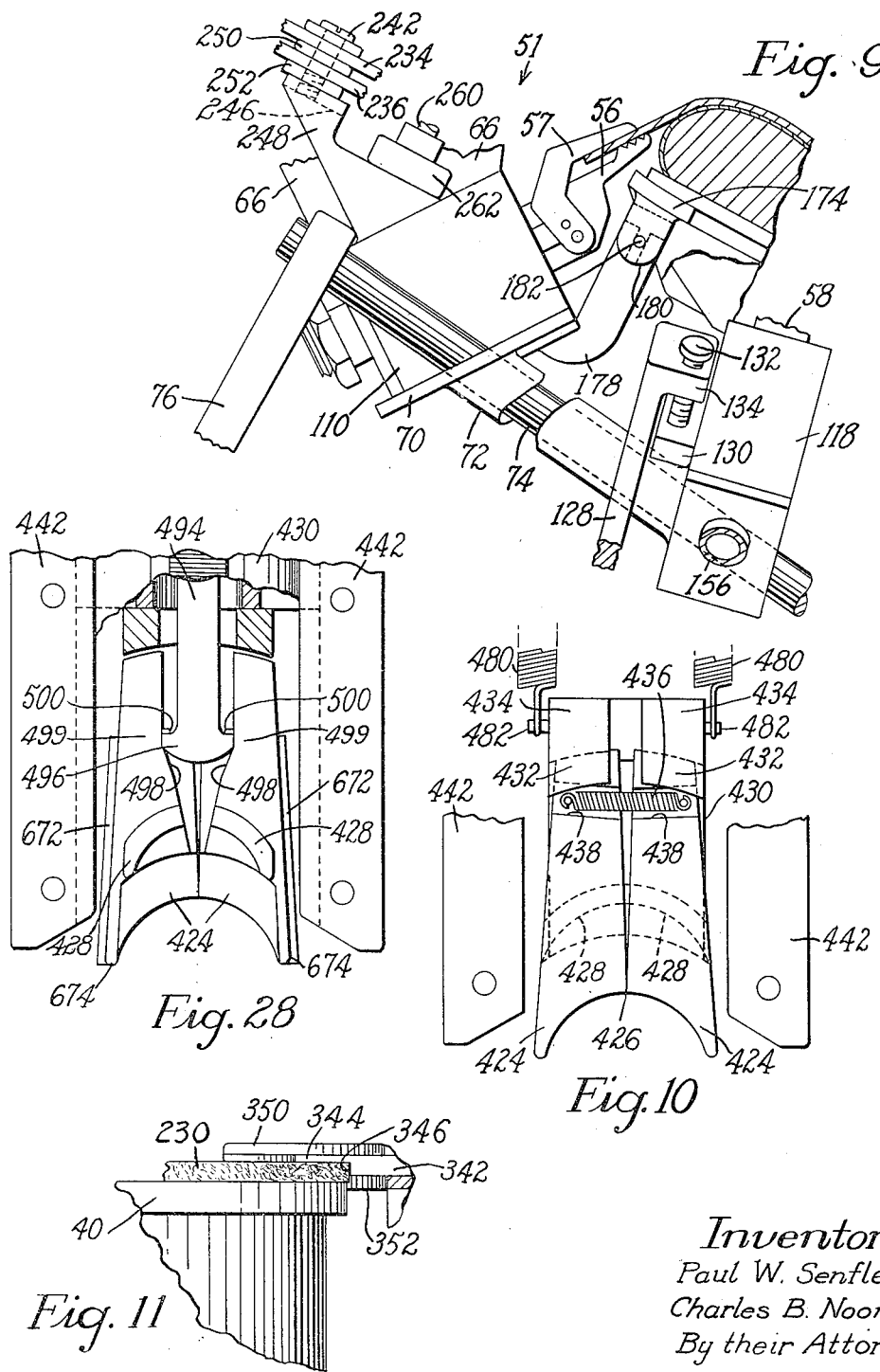

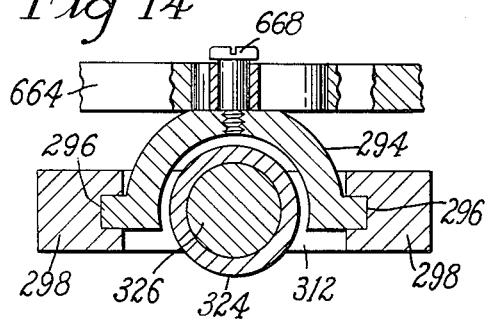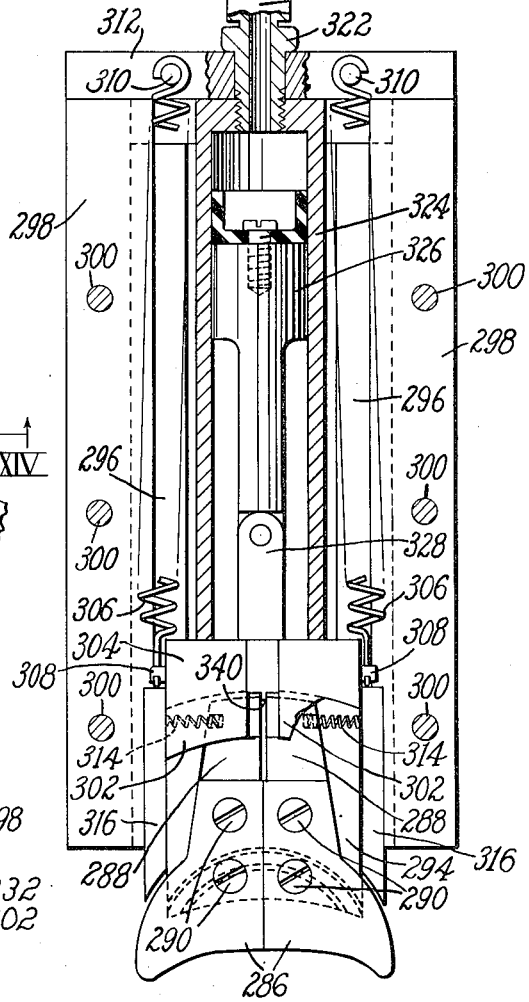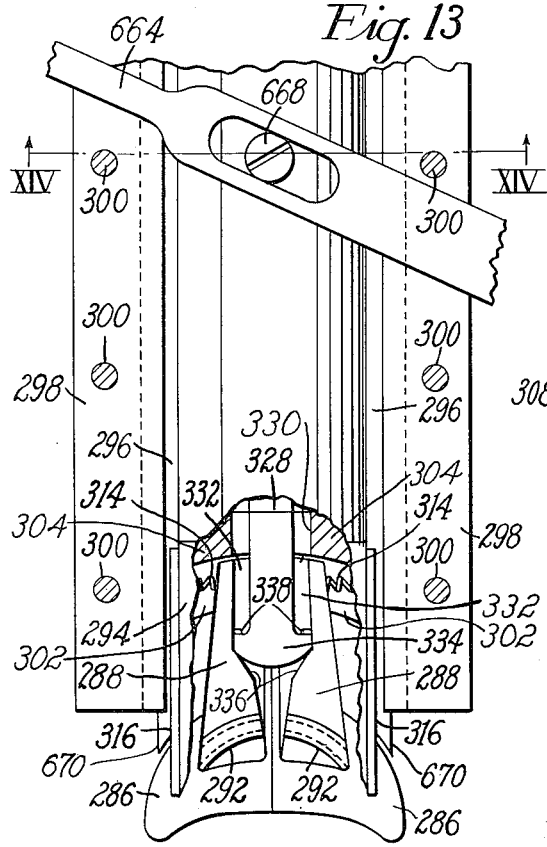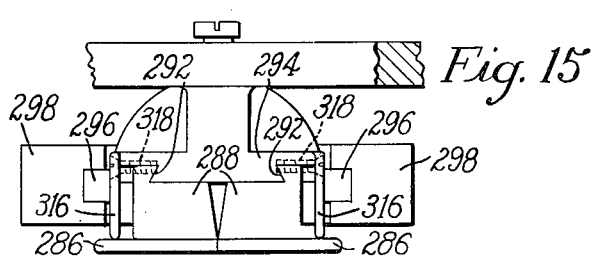
Inventors
Paul W. Senfleben
Charles B. Noonan
By their Attorney
Thomas J Ryan.

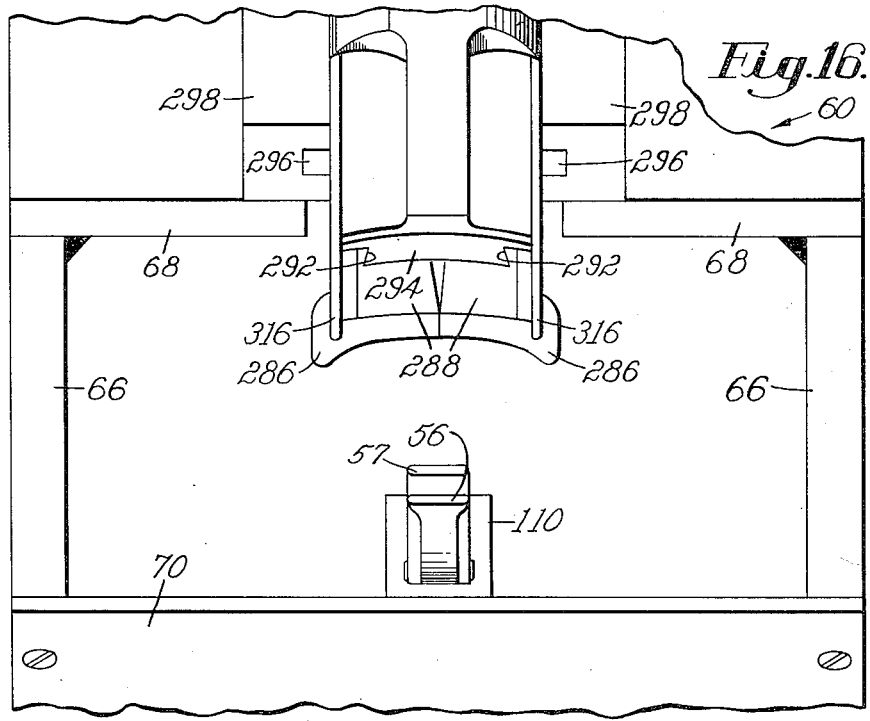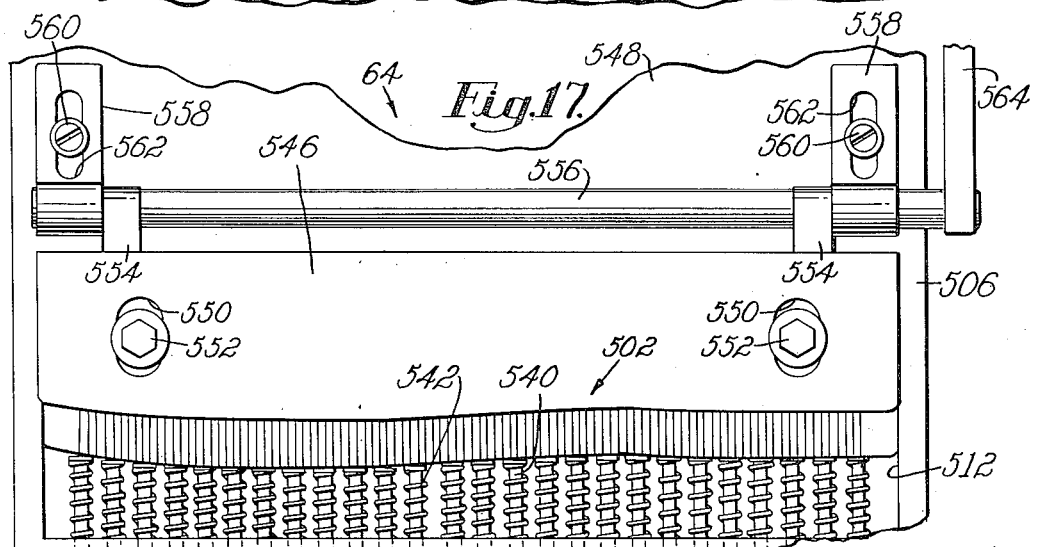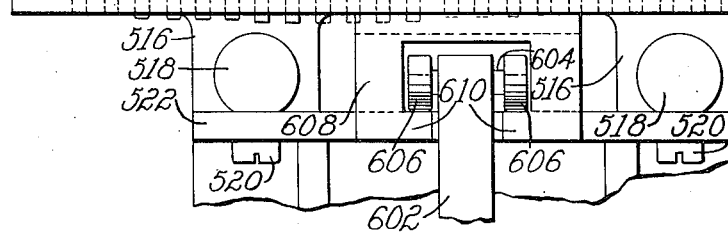

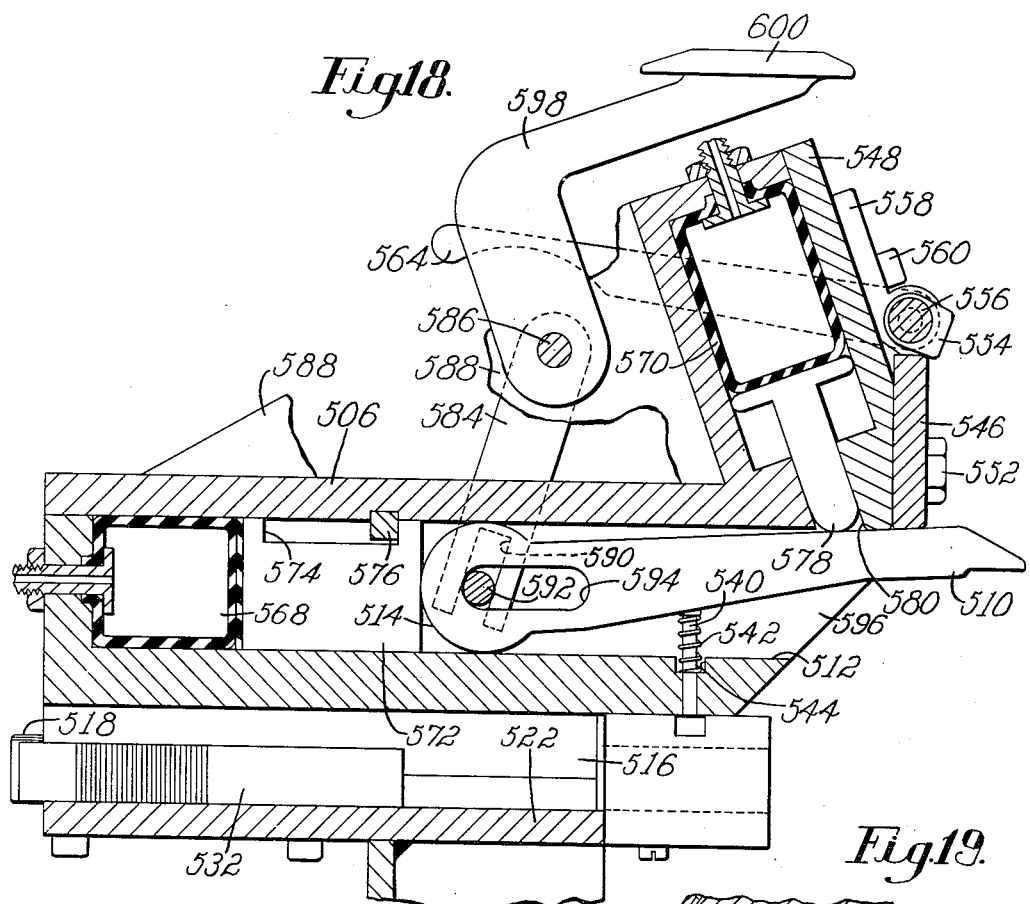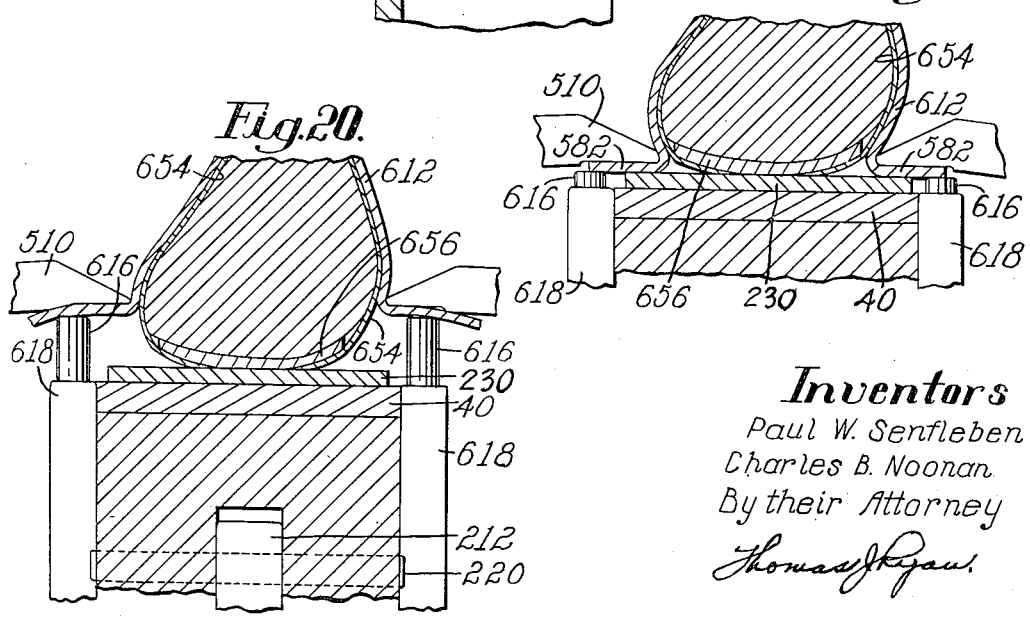

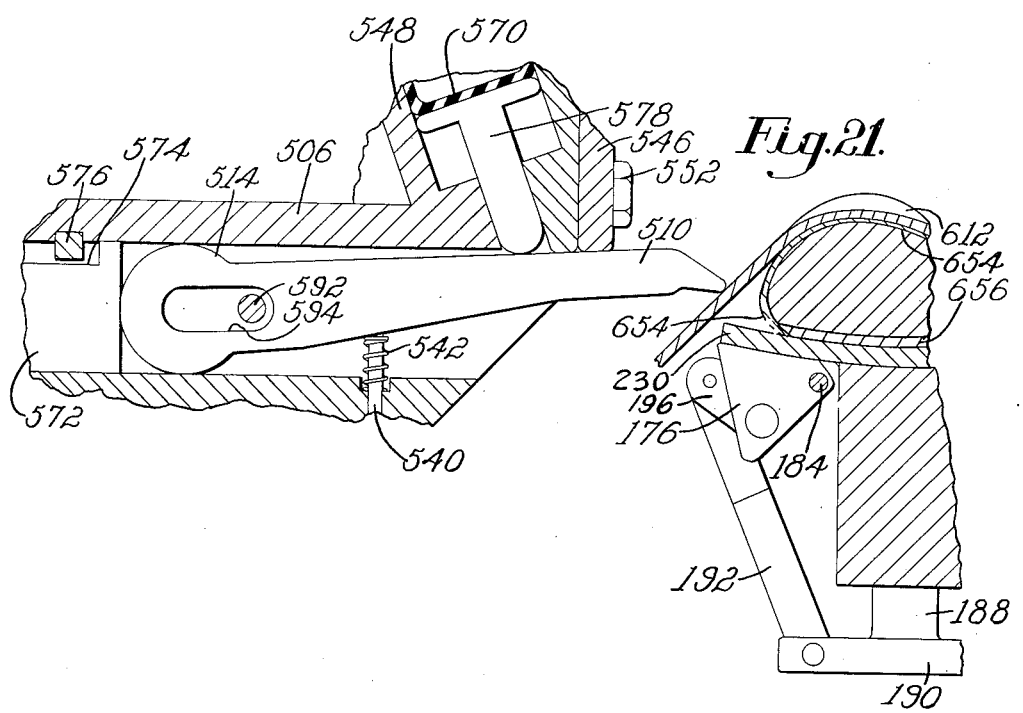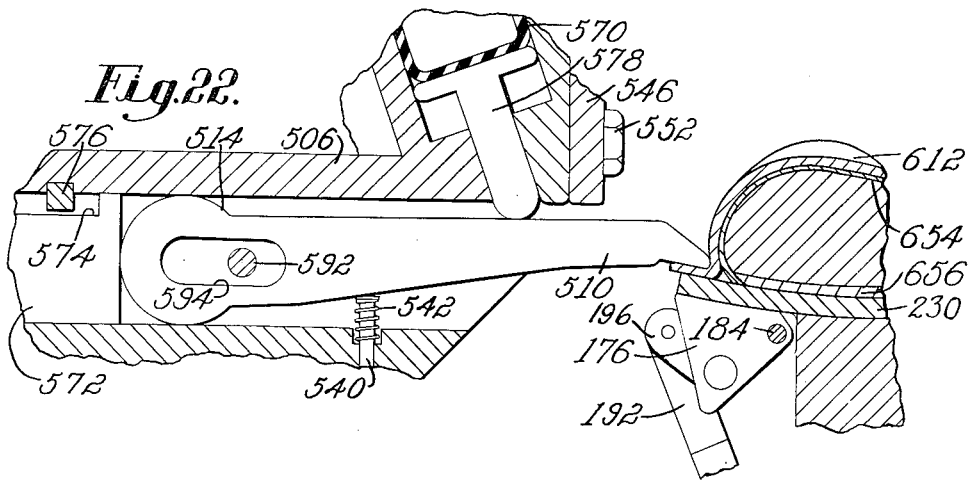

Inventors
Paul W. Senfleben
Charles B. Noonan
By their Attorney
Thomas J. Ryan

Sept. 18, 1956    P. W. SENFLEBEN ET AL    2,763,016
STITCHDOWN LASTING MACHINES
Filed Dec. 13, 1952    15 Sheets-Sheet 13

Inventors
Paul W. Senfleben
Charles B. Noonan
By their Attorney
Thomas J. Ryan.

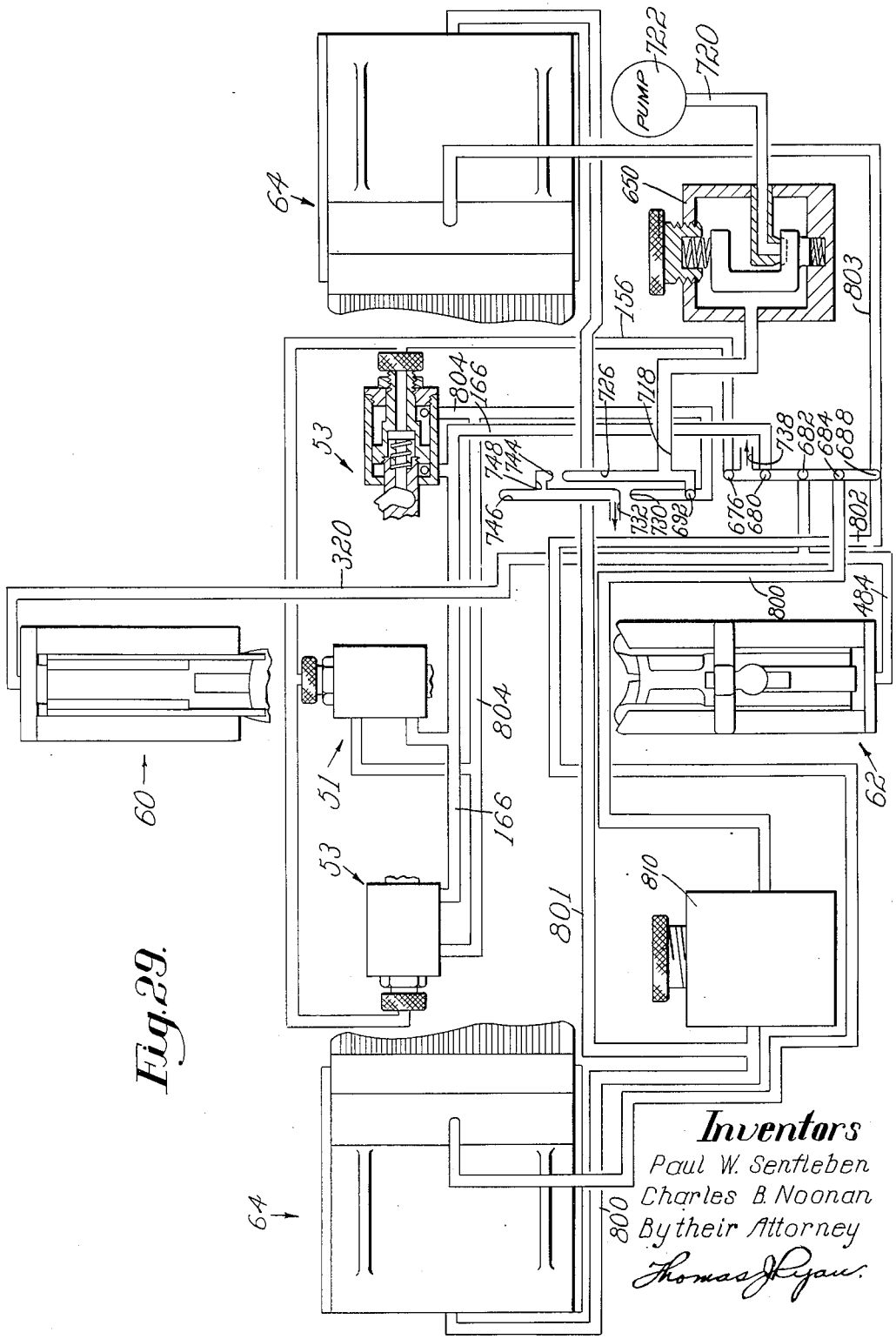

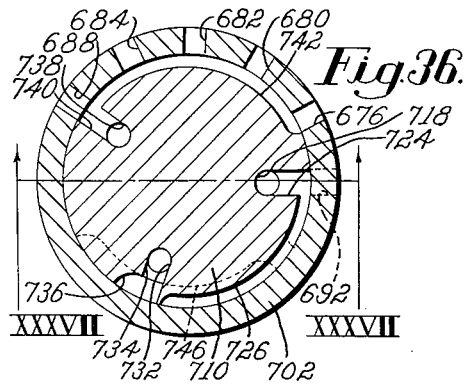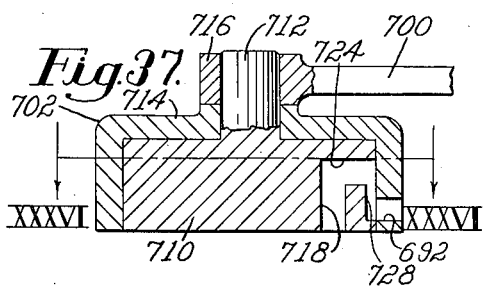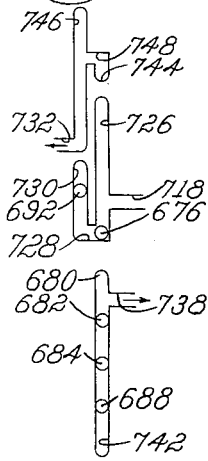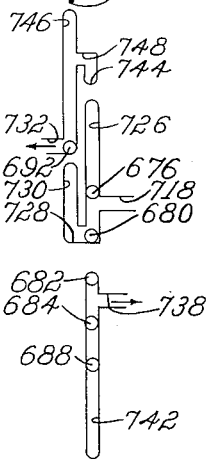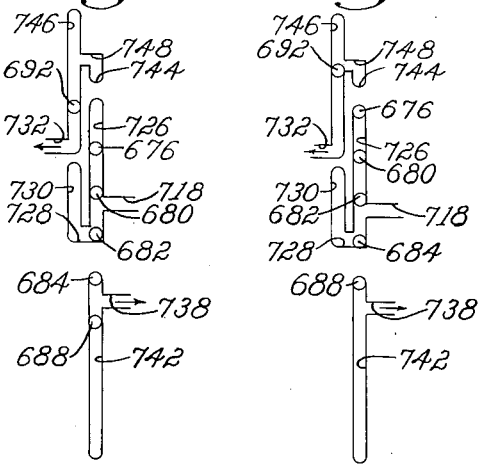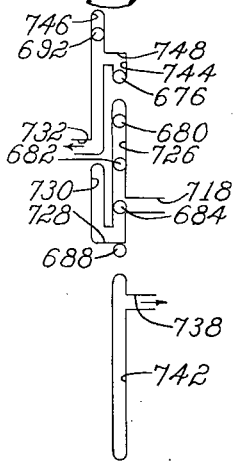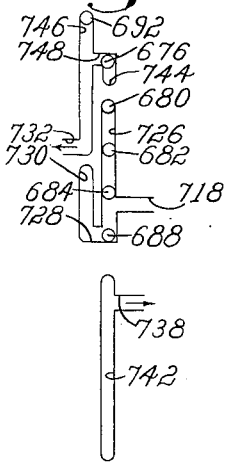
Inventors
Paul W. Senfleben
Charles B. Noonan
By their Attorney
Thomas J Ryan United States Patent Office 2,763,016
Patented Sept. 18, 1956

2,763,016

STITCHDOWN LASTING MACHINES

Paul W. Senfleben, Beverly, and Charles B. Noonan, Newburyport, Mass., assignors to United Shoe Machinery Corporation, Flemington, N. J., a corporation of New Jersey Application December 13, 1952, Serial No. 325,802

66 Claims. (Cl. 12—7.5)

This invention relates to machines for shaping the shoe uppers and is herein illustrated as embodied in a machine for shaping stitchdown uppers over lasts and for pressing together the outwardly flanged margin of the upper and the margin of an extension sole which has preferably been coated with cement for the attachment of the upper thereto. The term "extension sole" is to be understood to define generically any one of a number of different types of soles having their margins extending outwardly beyond the edges of the bottom surfaces of their lasts. In stitchdown shoemaking, extension soles comprise outsoles, mid-soles and extension insoles. While the invention is herein illustrated in its application to machines for shaping stitchdown uppers over lasts it is to be understood that the invention is not limited in its scope to such machines but is applicable, in certain aspects thereof, to machines for shaping uppers other than stitchdown uppers and to machines for shaping uppers over forms other than lasts.

In shaping stitchdown uppers over lasts it has been the usual practice to shape the toe portion, the heel portion, and the side portions in separate machines constructed to perform those specific operations. It is an object of the present invention to provide in a machine for shaping stitchdown uppers over lasts instrumentalities for shaping the toe, heel and side portions of a stitchdown upper in a single operation. More specifically, it is an object of the invention to provide in such a machine upper shaping instrumentalities which will operate on a given run of shoe sizes without substituting instrumentalities of one size for instrumentalities of a different size in adjusting the machine for operation on different sizes within the run.

With the above and other objects in view, as will hereinafter appear, the present invention in one aspect thereof consists in the provision in a machine for shaping shoe uppers over lasts of side wiper assemblies each comprising a plurality of wiper plates mounted on edge and arranged in mutually contiguous relation and in cooperating relation to a plurality of end wiper plates constructed and arranged to receive in overlying relation a portion of the side wiper plates and to operate with the side wiper assemblies to last the entire periphery of a shoe in the machine. The side wiper plates operate in combination with means for supporting in upright position a shoe upper on its last and a sole having a margin extending beyond the last bottom and arranged to receive the outwardly flanged margin of the upper. The side wiper plates are mounted in a member or carrier for bodily movement relatively to a shoe in the machine by power operated means to bring them into contact with the peripheral portion of the shoe and for swinging movement heightwise of the shoe by another power operated means to cause the wipers to wipe the upper heightwise of the last. Mounted in the side wiper carrier is an expander or bladder constructed and arranged to impart to the wiper plates angular or swinging movement heightwise of the shoe. Each side wiper plate comprises an arm having a discoidal hub at one end thereof and means, herein illustrated as the upper and lower walls of a chamber in the carrier above referred to, is provided for mounting the hub for rotary and translatory movements. In order to cause the side wiper plates to engage the periphery of the upper along a predetermined line the illustrated machine is provided with a contour bar which determines the limit of the swinging movement of the side wiper plates in one direction. The contour bar is adjustable heightwise of the shoe and is located in adjusted position by an adjustable member having a plurality of abutment surfaces for determining alternatively a plurality of constant adjustive positions of the contour bar.

To provide for an initial retractive movement of the side wipers following the completion of the side wiping operation the illustrated machine is provided with manually operated means for effecting a movement of translation of the wipers away from the shoe. For returning the wiper fingers to their retracted positions heightwise of the shoe means herein illustrated as a plurality of springs is provided for imparting to the wiper fingers angular movement to bring them into engagement with the contour bar. For cooperating with the side wiper assemblies to last an end portion of a shoe the illustrated machine is provided with a pair of end lasting wipers mounted on a slide which is actuated by a plunger to advance the slide lengthwise of the shoe. Each end lasting wiper has associated therewith an abutment constructed and arranged to arrest the advancement of a portion of the side wipers extending beyond the end of the shoe. In the illustrated organization the abutment member is a flange projecting from a wiper plate and arranged to extend generally lengthwise of a shoe in the machine.

In accordance with a further feature of the invention the illustrated machine is provided with end lasting means comprising a pair of wiper plates each characterized by a flange providing an abutment for arresting a portion of the side wipers and by a land having formed therein a cam surface, the cam surfaces of the two wipers being arranged relatively to each other so as to receive between them a member for actuating the wipers. For directing the advancement of the wipers by the member suitable tongue-and-groove connections are provided between the wipers and the wiper carrier.

For tensioning the toe portion of the upper about a last mounted on the work supporting plate the illustrated machine is provided with a toe gripper and a pair of side grippers constructed and arranged to operate at opposite sides of a shoe in the machine and the work supporting plate is provided with three marginal recesses affording clearance for the operation of the grippers and with means operating, after the grippers have performed their upper tensioning operation and have retracted, for closing the recesses in order to provide support for those portions of the shoe overlying the recesses. The illustrated work supporting plates are characterized by a recess closing means comprising a member hinged between side walls of the recess and constructed and arranged to serve as part of the work supporting means when it is located in its recess closing position.

In order to permit the use of pressure sensitive cement for the attachment of the outwardly flanged margin of a stitchdown shoe upper to the margin of the extension sole, the illustrated machine, in accordance with a further feature of the invention, is provided with means for holding the upper out of contact with the cement coated margin of the sole during a portion of the advancement of the lasting wipers. At one end of the shoe the margin of the upper is held out of contact with the margin of the sole by a flange extending inwardly over the margin of the sole from a plate constructed and arranged to locate the sole by engagement with its edge face. At the other end of the shoe the lasting margin of the upper is held out of contact with the margin of the sole by a plurality of fingers which also serve to center the last by engagement with opposite side portions thereof. For preventing contact of a side portion of the lasting margin of the upper with the margin of the sole a pin is constructed and arranged to engage the inner surface of the margin of the upper. In the illustrated organization the pin is mounted for yielding movement heightwise of the last during the lasting operation to permit the lasting margin to come into contact with the sole when the lasting operation is completed.

For actuating the upper tensioning grippers a pressure fluid actuated piston is constructed and arranged to advance the gripper carrier generally heightwise of the upper in order to bring the gripper jaws into upper engaging position and a second pressure fluid actuated piston is provided for closing the gripper jaws on the work. After the gripper jaws have closed, the upper is tensioned by relative movement of the gripper and the work support heightwise of the upper.

In accordance with a further feature of the invention the illustrated work supporting plate is provided with novel means for providing support for that portion of the margin of the sole overlying the clearance recess at the extremity of the toe portion of the supporting plate, said means comprising a slide mounted in said recess, and connections between the slide and the gripper carrier for causing the slide to move in unison with the gripper during the adjustment of the gripper carrier to position the gripper in accordance with the size of the upper to be operated upon.

These and other features of the invention will now be described with reference to the accompanying drawings and pointed out in the appended claims.

In the drawings,

Fig. 1 is a left side elevation of a machine embodying the features of the present invention;

Fig. 2 is an enlarged detail view illustrating a portion of the mechanism in the heel head of the machine;

Fig. 3 is a plan view showing the operating instrumentalities retracted and the work supporting mechanism in position to receive a last and shoe parts to be operated upon;

Fig. 4 is a plan view showing the machine at an intermediate stage in the operating cycle with a shoe mounted therein;

Fig. 5 is a plan view of the central portion of the machine showing a small shoe mounted therein;

Fig. 6 is a plan view similar to Fig. 3 showing certain mechanisms omitted from Fig. 3, the opposite side portions of the machine being broken away;

Fig. 7 is a section taken substantially on the line VII—VII of Fig. 3 and illustrating particularly the side gripper mechanism;

Fig. 8 is a section on the same plane as Fig. 7 showing an upper being operated upon by the grippers;

Fig. 9 is a side elevation of the toe gripper mechanism operating on an upper, the upper and a last being shown in section on the longitudinal median line of the last;

Fig. 10 is a bottom view illustrating the heel wipers and associated parts;

Fig. 11 is a side elevation illustrating a portion of the heel end of the work support with a portion of a sole mounted thereon and a portion of a plate for locating the heel end of the sole;

Fig. 12 is an enlarged bottom view of the toe wiper head partly in section on the axis of the piston which actuates the wipers;

Fig. 13 is an enlarged plan view of a portion of the toe wiper head with certain parts broken away to disclose a portion of the wiper operating mechanism;

Fig. 14 is a section on the line XIV—XIV of Fig. 13;

Fig. 15 is an enlarged front elevation of the toe wiper head;

Fig. 16 is an enlarged elevation looking from the central portion of the machine toward the toe wiper head and illustrating portions of the toe wiper mechanism and the toe gripper assembly;

Fig. 17 is an enlarged elevation looking outwardly from the center of the machine and illustrating the side wiper assembly at the left side of the machine;

Fig. 18 is an enlarged section on the line XVIII—XVIII of Fig. 3 showing one of the side wiper fingers and its operating mechanism;

Fig. 19 is an enlarged section on the line XIX—XIX of Fig. 4;

Fig. 20 is a sectional view similar to Fig. 19 showing the operating parts at a different stage in the machine cycle;

Fig. 21 is an enlarged sectional view taken on the same plane as Fig. 18 showing the wiper partially advanced and showing also a portion of a sole, a last and an upper on the work support;

Fig. 22 is an enlarged sectional view similar to Fig. 21 showing the position of the wiper at the end of the wiping operations;

Fig. 28 is an enlarged plan view of a portion of the heel wiper head with certain parts broken away to disclose a portion of the wiper operating mechanism;

Fig. 29 is a diagram of the pneumatic operating mechanisms;

Figs. 30 to 35 are diagrammatic views illustrating different positions of the pneumatic valve for controlling the pneumatic operating mechanisms;

Fig. 36 is a section on the line XXXVI—XXXVI of Fig. 37; and

Fig. 37 is a section on the line XXXVII—XXXVII of Fig. 36.

Figure 23:
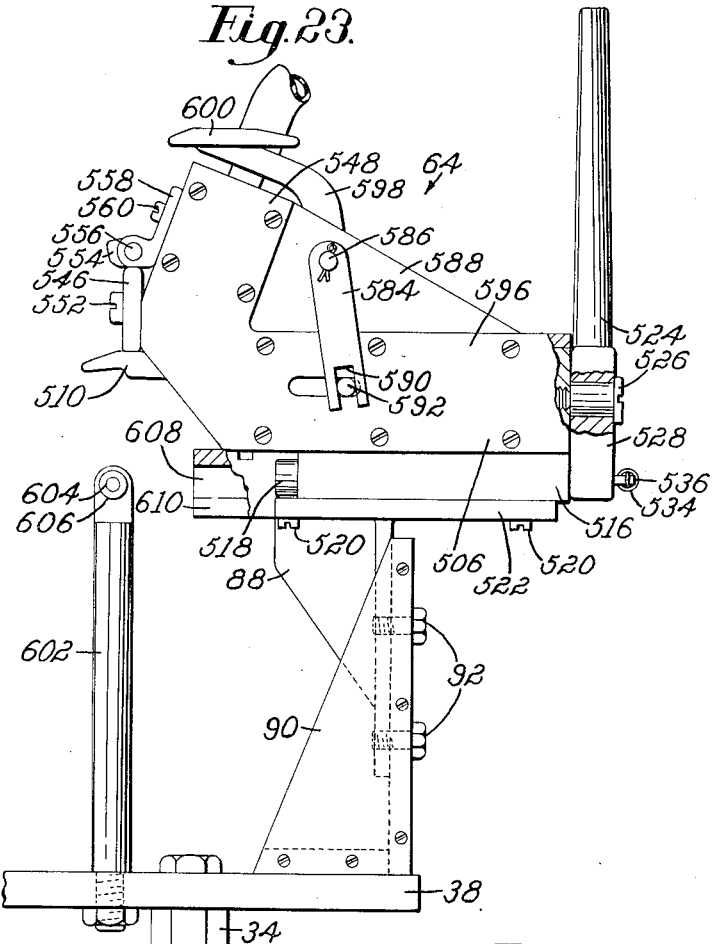
Fig. 23 is a front elevation of one of the side wiper heads and its supporting mechanism.

The machine illustrated in the drawings is constructed and arranged to shape a stitchdown shoe upper upon a last and to bring the outturned lasting margin into adhesive contact with the margin of an extension sole, herein illustrated as an outsole, projecting outwardly from the edge of the last bottom and supported in generally upright position on a plate having the general shape of a last bottom and being somewhat greater in area than the outsole mounted thereon. The lasting instrumentalities comprise butting point toe wipers and butting point heel wipers which have the usual butting point wiper motions, and side wiper assemblies comprising a plurality of wiper fingers or plates which move inwardly in rectilinear paths to engage the opposite side portions of the upper on the last at points offset heightwise of the last from the margin of the outsole, and then move heightwise of the last toward the outsole to wipe the upper against the periphery of the last and to bring the outturned lasting margin of the upper into adhesive contact with the margin of the outsole. The outsole is accurately positioned on the sole supporting plate by gage plates which engage the edge face of the outsole at the heel end and by fingers which engage the marginal portion of the outsole at opposite sides of its toe portion. The last is freely mounted in generally upright position on the outsole and is positioned relatively thereto by the engagement of the heel wipers with the heel end of the upper and by the engagement of suitable fingers with the periphery of the last at opposite sides of its toe portion. To prepare the upper for the operation of the wipers the upper is tensioned over the last by a toe gripper and by grippers at opposite sides of the tip line portion of the upper. To provide clearance for the operation of the toe gripper the sole supporting plate is provided with a recess at the toe end of its marginal portion adjacent to the toe gripper and a slide is mounted in the recess in the plate and arranged to support the marginal portion of the sole until the retraction of the slide is required to provide clearance for the advancement of the gripper mechanism. Similarly, the opposite sides of the sole supporting plate are provided with recesses which afford clearance for the operation of the side grippers and suitable supporting members or blocks are hinged between the side walls of the recesses and are swung downwardly to provide clearance for the operation of the side grippers and are swung upwardly after the completion of the operation of the grippers to support those portions of the margin of the outsole overlying the recesses. The slide at the toe end of the sole supporting plate and the blocks at opposite sides of the plate support marginal portions of the outsole for the toe lasting and the side lasting operations.

Referring to Fig. 1, the invention is illustrated as embodied in a machine having a base comprising a column the upper portion only of which is illustrated in Fig. 1 and identified by the numeral 30. The lower portion of the column flares outwardly and terminates in three feet whereby the machine is supported. Fixed to the upper end of the column 30 is a plate or head 32 which has fixed to its forward portion a short upright plate 34 and to its rear portion a relatively long plate 36 which extends upwardly with a forward inclination. The angular upper edge faces of the plates 34 and 36 lie in a common plane disposed at an angle of approximately 30° to the head 32 and have attached thereto a plate 38 which forms the base of the machine head. The arrangement of the machine head at an upward inclination from the front of the machine facilitates the presentation of the shoe to the machine and the manipulation of the operating instrumentalities and affords a high degree of visibility of the lasting operation.

The illustrated machine is provided with work supporting means comprising a generally sole shaped plate 40 fixed to a base 42 which has extending downwardly from its forward portion a threaded stem 44 (Fig. 25) and from its rear portion a smooth stem 46. The stem 44 extends downwardly into a hollow post 48 projecting upwardly at right angles from the base plate 38. The work supporting assembly is supported by the engagement of a nut 52 on the stem 44 with the upper edge of the hollow post 48, the nut being adjustable on the stem to vary the position of the work supporting plate heightwise of a shoe supported thereon. The stem 46 is slidably mounted in a bore in a post 54 projecting upwardly from the base plate 38 at right angles thereto. It will be understood that the stem 46 serves merely to determine the angular disposition of the work supporting assembly relatively to the operating instrumentalities of the machine.

For tensioning a shoe upper over a last arranged in generally upright position on an outsole supported on the plate 40, the illustrated machine is provided with a toe gripper 51 comprising a pair of jaws 56 and 57 (Fig. 9) and two side grippers 53 (Fig. 7) each comprising the jaws 58 and 59. The side grippers engage the lasting margin of the upper at opposite sides of the upper in the region of the tip line and serve to tension the upper widthwise across the toe portion and instep portion of the last while the toe gripper, moving heightwise of the shoe with an inclination rearwardly away from its toe end, imparts a lengthwise tension to the upper. Upon the completion of the operation of the grippers the toe portion of the upper is shaped over the last by a pair of toe wipers mounted in a toe head 60 (Fig. 1) and the heel portion is shaped over the last by the operation of heel wipers mounted in a heel head 62. The wipers wipe the upper heightwise of the last toward a sole mounted on the plate 40 and during their heightwise movement the wipers advance to wipe the upper inwardly into the angle defined by the periphery of the last and the extension of the sole in order to form a well defined crease at the apex of the angle defined by the body portion of the upper and its outturned margin. Upon the completion of the operation of the toe wipers and the heel wipers the opposite side portions of the upper are shaped over the last by two sets of wiper fingers arranged at opposite sides of the plate 40, each set of fingers being mounted in a side wiper head 64. In Fig. 1 the side wiper head at the farther side of the machine is illustrated, the nearer side wiper head being omitted to permit the illustration of other operating mechanisms. The toe head 60 is mounted for bodily movement lengthwise of a shoe in the machine in a plane substantially parallel to the forward end of a sole mounted on the plate 40. The heel head 62 is movable both lengthwise of the shoe and generally heightwise thereof. Each side wiper head 64 remains in a fixed position during the operation of the machine, the side wipers themselves being mounted for movement heightwise and widthwise of the last to effect the side lasting operations. For mounting the toe head 60 two parallel triangular plates 66 (Fig. 1) extend downwardly from a base plate 68 of the toe head 60. The triangular plates are disposed at opposite sides of the base plate, only the farther triangular plate being shown in full in Fig. 1. The triangular plates terminate at their lower ends in edge faces extending forwardly with a slight upward inclination. Secured to said edge faces and spanning the width of the machine is a rectangular plate 70. Fixed to the opposite end portions of the plate 70 and extending forwardly in parallel relation to each other are two sleeves 72. As shown in Fig. 1, the sleeves 72 lie in a plane disposed at an angle of approximately 10° to the base plate 38. The plate 70 is drilled to provide openings therethrough in alinement with the openings in the sleeves 72 thus to provide for the mounting of the sleeves on parallel cylindrical rails 74. Each rail is mounted at its rear end in the upper portion of a bracket 76 fixed to the base plate 38 and at its forward end in the upper portion of a bracket 78 fixed to the base plate.

Figure 25:
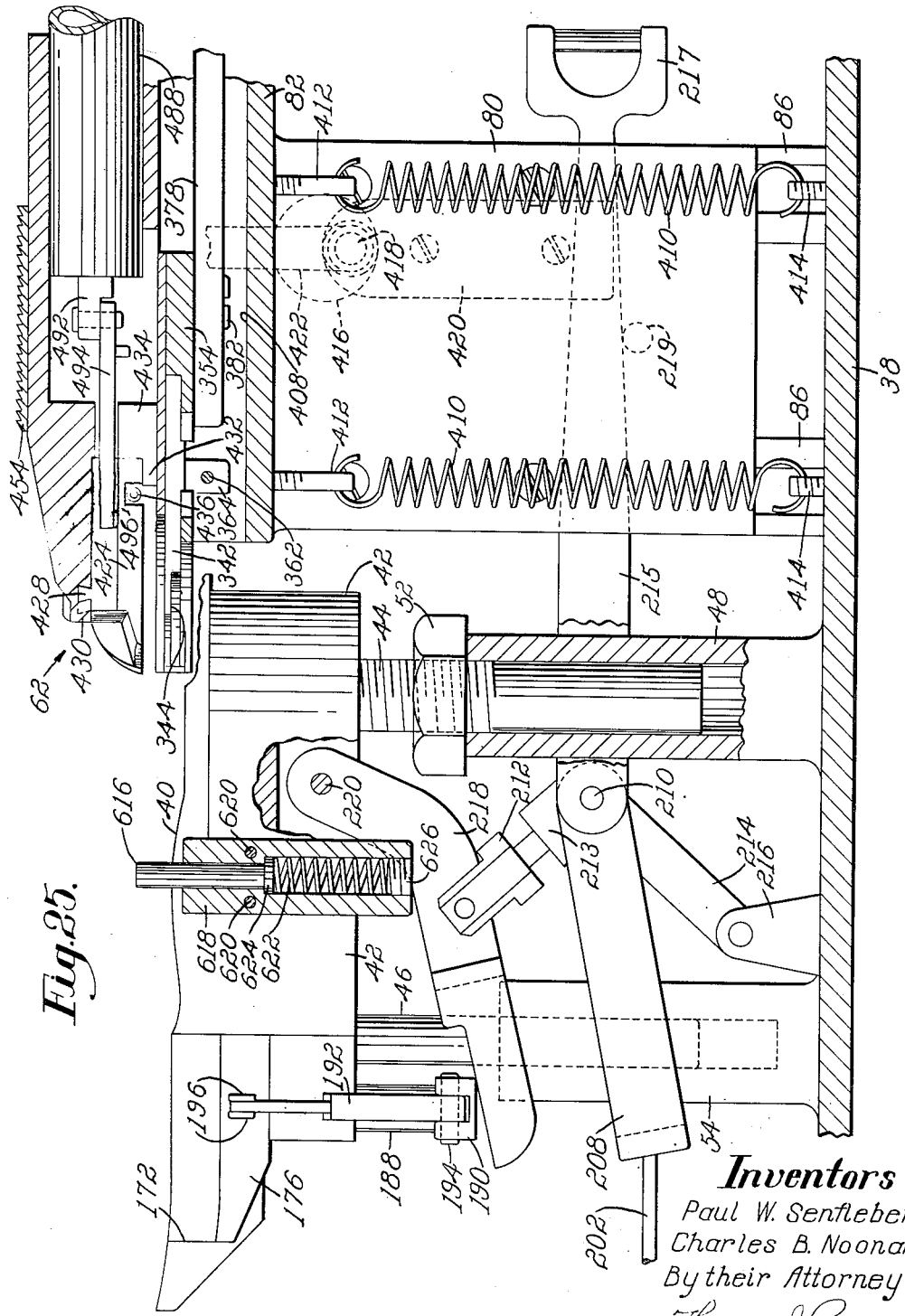
Fig. 25 is an enlarged side elevation of the work supporting assembly and the heel head, the heel head being shown partly in section on the line XXV—XXV of Fig. 3.
Figure 26:
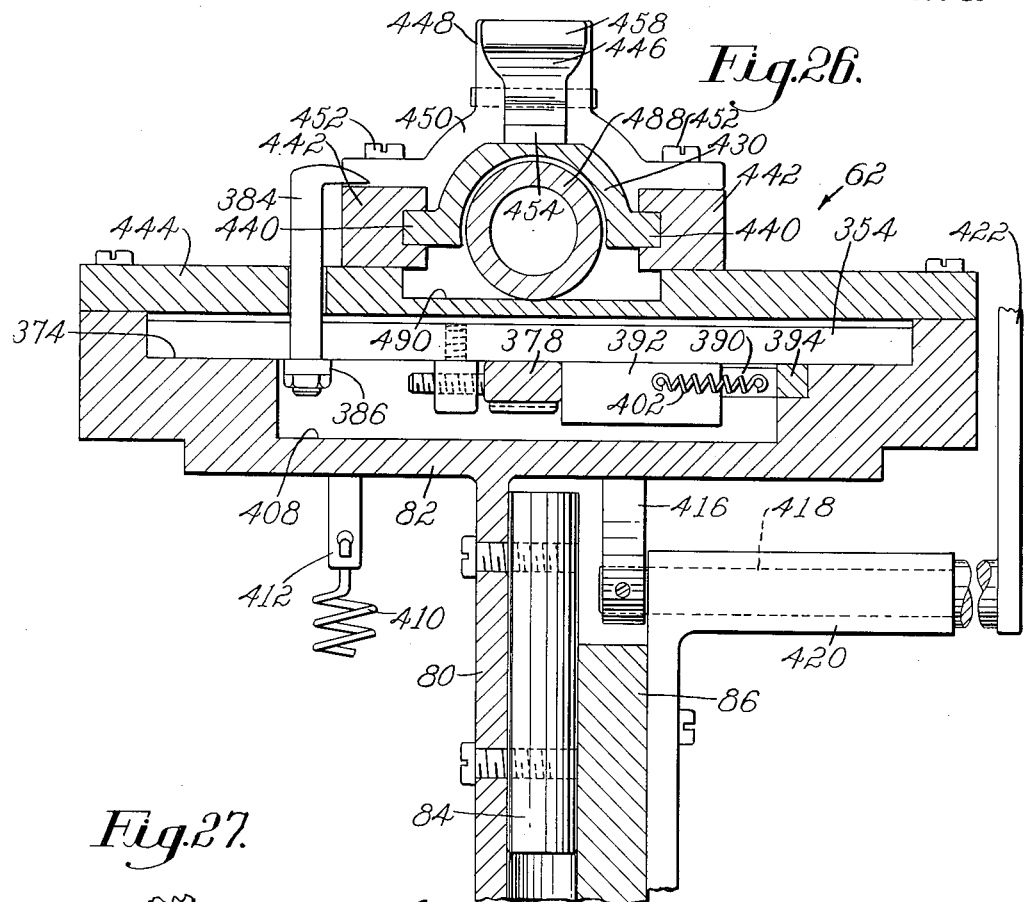
Fig. 26 is an enlarged section on the line XXVI—XXVI of Fig. 3.

To provide for the clamping of an outsole to the supporting plate 40 the heel head 62 is mounted for movement in a path at right angles to the base plate 38. To this end a plate 80 (Fig. 25) is arranged to extend vertically downwardly from the base portion 82 of the heel head. Fixed to the right side portion of the plate 80 and arranged parallel to its side edges are two cylindrical members one of which is illustrated in Fig. 26 and identified by the numeral 84. Two posts 86 fixed to the base plate 38 and extending upwardly at right angles thereto are bored to provide cylindrical grooves in which the cylindrical members 84 are mounted for sliding movement.

For mounting the side wiper heads 64 a bracket 88 (Fig. 23) is arranged to extend downwardly from the base portion of each of the wiper heads. The bracket 88 fits into a bracket 90 fixed to and projecting upwardly at right angles from the base plate 38, the two brackets being secured together by two headed screws 92.

To hold the last against upward movement during the lasting operations a holddown member herein illustrated as a plunger 94 (Figs. 1 and 3) is slidably mounted for movement heightwise of the last in a head at the free end of a slide 96 mounted in a channel formed in an arm 98 mounted for angular movement at the upper end of a post 100 fixed to and extending upwardly at right angles from the base plate 38. The plunger is normally held at the limit of its downward movement by a spring 102 surrounding the stem of the plunger and confined between the head at the lower end of the plunger and the bottom of a sleeve 104 fixed to and extending downwardly from the slide 96. The normal position of the plunger is determined by the engagement of a head 106 fixed to the upper end portion of the plunger with the head 108 at the end of the slide 96. The head 106 is shaped to be grasped by the operator and employed as a handle for swinging the holddown into last engaging position and for elevating the plunger to cause it to clear the last as it moves inwardly over its cone face.

Referring to Fig. 9, the toe grippers 51 and the side grippers 53 are mounted, for movement as a unit, generally lengthwise of the shoe, on a carriage comprising the cross plate 70 and the two sleeves 72 fixed thereto and slidably mounted on the rails 74. For mounting the toe gripper assembly there is rigidly mounted on the central portion of the cross plate 70 and arranged to extend upwardly therefrom a housing 110 which is arranged to afford movement of the toe grippers toward the toe end of the shoe at an upward inclination of approximately 30°. For mounting each of the side gripper assemblies a short arm 116 is fixed to the forward end portion of the sleeve 72 and arranged to extend outwardly therefrom. As shown in Fig. 7 the arm 116 carries a housing 118 in which the gripper assembly is mounted. Projecting downwardly from the outer portion of the housing 118 are two ears 122 which engage opposite side faces of the arm 116 and are pivotally connected thereto by a pin 124 (Fig. 7). Each side gripper assembly is yieldingly held in its position shown in Fig. 7 by a spring 126 the lower end of which is connected to the lower end of an angle arm 128 fixed to the sleeve 72 at a point adjacent to the housing 118 and between the housing and the bracket 76. The normal rest position in which the side gripper assembly is maintained by the spring 126 is determined by the engagement of an ear 130 (Fig. 9) projecting outwardly from the housing 118 with a stop screw 132 extending downwardly from an outturned upper end portion 134 of the angle arm 128. Identical mechanisms are provided for operating the toe gripper and the side grippers. Referring to Fig. 7, in which the mechanism for operating the right side gripper is illustrated in detail, the inner gripper jaw 58 is an extension of a cylindrical member or carrier 136 slidably mounted in a bore in the upper end wall of the housing 118 and fixed to the head 138 of a plunger or piston mounted in a bore 140 formed in the housing. The plunger has a stem 142 which extends downwardly and outwardly from the head 138 and is slidably mounted in a bore in the center of a cover plate 144 at the lower end of the housing 118. For imparting closing movement to the gripper jaw 59 a piston 146 is slidably mounted in a bore 162 in the head 138. A stem 148 extending from the head of the piston is slidably mounted in an axial bore in the cylindrical member 136 and is connected by a link 150 to the gripper jaw 59. The gripper jaws are normally held open by a spring 152 surrounding the stem 148 and seated at its upper end against the base of a counter bore 154 in the cylindrical member and at its lower end against the head of the piston 146. For closing the gripper jaws a fluid pressure medium such, for example, as compressed air, is transmitted through a hose 156 connected to a stem 158 projecting from the stem 142 and communicating through an axial opening 160 extending through the stems 158 and 142 with the bore 162 in the head 138 of the plunger. After the gripper jaws are closed on the upper they are moved downwardly and outwardly to apply tension to the upper by the application of fluid pressure, preferably compressed air, to the upper end wall of the head 138. To this end the housing 118 is provided with a port 164 communicating with a pressure line 166. Upon the completion of the tensioning operation the air pressure in the hose 156 is shut off and the spring 152 expands and moves the piston 146 downwardly and to the right to open the gripper jaws. If desired, air pressure in the line 166 may be maintained until the next operation of the machine but at an early stage in the next operation the air pressure in the line 166 must be shut off to permit the transmission of air pressure through a line 168 into the outer or lower portion of the housing 118 in order to move the plunger 138 upwardly and to the left to bring the gripper jaws into upper engaging position. The upper engaging position of the gripper jaws is determined by the engagement of a nut 224 with the outer surface of the cover plate 144, the nut as shown in Fig. 7 being mounted on a threaded portion 226 of the stem 158. When there is no shoe in the machine movement of the plunger 138 to the right, as seen in Fig. 7, is limited by the engagement of a shoulder 228 formed in the stem 142 with the inner surface of the cover plate 144.

Referring to Fig. 3, the work supporting plate 40 is provided with an open-ended slot 170 in its toe end portion to provide clearance for the operation of the toe gripper jaws 56 and 57, and with suitable recesses 172 in opposite sides of the forepart section of the plate 40 to provide clearance for the operation of the side gripper jaws 58 and 59. In order to provide for a limited range of adjustment of the toe grippers and the side grippers for operation on shoes of different sizes, the slot 170 and the recesses 172 are extended lengthwise of the work supporting plate 40 so as to provide clearance for the operation of the grippers on all shoes in the contemplated size range. To provide for the support during the lasting operations of those portions of the margin of a sole overlying the slot 170 and the recesses 172 a slide 174 (Fig. 9) is mounted between the walls of the slot and two blocks 176 (Fig. 7) are hinged between the side walls of the recesses 172, respectively. Referring to Fig. 9, the slide 174 is adjusted longitudinally of the slot 170 during the adjustment of the grippers by the action of an arm 178 projecting forwardly, then upwardly from the plate 70 and having its upper end portion positioned between parallel ears 180 extending downwardly from the slide 174, the upper end portion of the arm being slotted to receive a cross pin 182 mounted in the ears. Referring to Figs. 7 and 8, the blocks 176 are mounted respectively on cross pins 184 fixed in the opposite side walls of the recesses 172. The cross pins are so arranged that when the blocks are swung upwardly into their sole supporting position shown in Figs. 21 and 22, their respective upper surfaces are flush with the upper surface of the work supporting plate 40. Preferably the sole supporting surfaces of the blocks are made slightly concave in order to conform to the contour of the sole supporting plate. The blocks 176 are normally held in their retracted or downswung position shown in Figs. 7 and 8 by a spring 186 mounted in a socket extending upwardly into the base portion 42 of the plate 40 and arranged to engage the upper end face of a stem 188. Fixed to the lower end of the stem is a crosshead 190 which is slotted at its opposite ends to provide for the pivotal mounting of two arms 192 on cross pins 194 in the opposite end portions of the crosshead. At their upper ends the arms 192 are pivotally mounted between parallel ears 196 projecting outwardly from the blocks 176. For swinging the blocks upwardly into their sole supporting position, shown in Figs. 21 and 22, a treadle 198 (Fig. 1) is pivotally mounted in the base of the machine and has pivotally mounted thereon a yoke 200 which provides an anchorage for the lower end of a flexible cable 202 which extends upwardly and rearwardly from the treadle to a pulley 204 pivotally mounted between fixed ears 206 at the rear of the machine. The cable extends forwardly with a downward inclination from the pulley 204 and is anchored at its forward end to the crossbar of a yoke 208 pivotally mounted on a cross pin 210 (Fig. 25) which provides the connection between two toggle links 212 and 214. At its lower end the toggle link 214 is pivotally mounted between ears 216 projecting upwardly from the base plate 38. At its upper end the toggle link 212 is pivotally connected to an arm 218 substantially midway between its ends. The forward end portion of the arm 218 is pivotally mounted on a cross pin 220 fixed in the base of the heel end portion of the work supporting plate which, as shown in Fig. 25, is recessed to receive the forward end portion of the arm 218. The rear portion of the arm 218 is bifurcated to straddle the post 54 and, as shown in Figs. 7 and 8, is arranged to engage opposite end portions of the crosshead 190. It will be seen that depression of the treadle 198 causes the toggle links 212 and 214 to be actuated to swing the arm 218 upwardly or in a clockwise direction, as seen in Fig. 25, thereby swinging the blocks 176 upwardly from their position shown in Figs. 7 and 8 and to their position illustrated in Figs. 21 and 22. The upward movement of the blocks 176 is completed with the toggle links 212 and 214 only partially straightened. The remainder of the straightening movement of the toggle links is employed to impart an upward movement of translation to the arm 218 and through the arm to the sole supporting plate 40. Upon the completion of the operation of the treadle 198 the toggle links come into a dead center position determined by the engagement of the head 213 (Fig. 25) at the lower end of the toggle link 212 with the front of the post 54 and thus positively hold the sole supporting plate against downward movement. To provide for the breaking of the toggle links to permit the return of the blocks 176 and the sole supporting plate 40 to their position shown in Fig. 25, an arm 215 is pivotally mounted on the cross pin 210 and extends forwardly to the front of the machine where it is provided with a D handle 217 for the convenience of the operator in drawing the arm forwardly to break the toggle links. The arm 215 is supported substantially midway between its ends by a pin 219 mounted in and projecting laterally from the plate 80.

Figure 24:
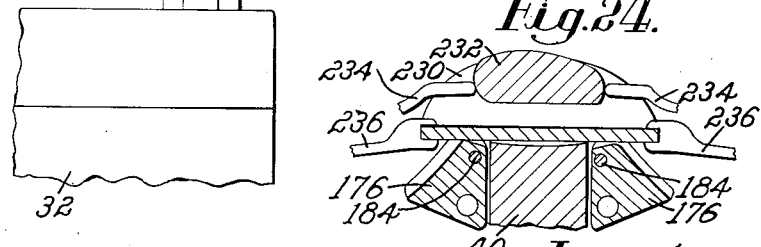
Fig. 24 is a section on the line XXIV—XXIV of Fig. 6.

Referring to Fig. 6, the toe portion of an outsole 230 mounted on the sole supporting plate 40 and the toe portion of a last 232 mounted on the outsole are located widthwise thereof relatively to each other and relatively to the operating instrumentalities of the machine by two pairs of fingers 234 and 236, the former engaging the periphery of the last and the latter the margin of the outsole. As shown in Fig. 24, the end portions of the fingers 236 are each bifurcated to receive the margin of the outsole while the fingers 234 have a point contact with the periphery of the last. As shown in Fig. 6, the forward portions of the fingers are spaced apart from each other to provide clearance for the operation of mechanism hereinafter described, and the central portions 238 of the fingers extend inwardly toward each other from the forward portions and form an acute angle with rearwardly extending portions 240 of the fingers. The two fingers 234 and 236 at the left side of the machine are pivotally mounted on a headed screw 242 extending through the fingers at the apices of the acute angles formed therein and similarly the two fingers 234 and 236 at the right side of the machine are pivotally mounted on a headed screw 244 located adjacent to the screw 242. Referring to Fig. 9, the screws 242 and 244 are mounted in a crosshead 246 at the rear end of arms 248 fixed to and extending rearwardly from the housing 110. Thus it will be seen that the fingers 234 and 236 move with the toe head 60 when it is adjusted for operation on shoes of different sizes and consequently the fingers are located relatively to the last and the outsole in their respective positions shown in Fig. 6 whatever the size of the shoe to be operated upon. As shown in Fig. 9, the fingers 234 are positioned above the fingers 236 and are spaced therefrom by washers 250 and the fingers 236 are spaced from the crosshead 246 by similar washers 252. Referring to Figs. 1 and 6, the last engaging end portions of the fingers 234 are urged toward each other by a spring 254 connecting the forward portions of the fingers and similarly the work engaging end portions of the fingers 236 are urged toward each other by a spring 256 connecting the forward portions of the fingers. To provide for equal and opposite movement of the fingers 234 toward and from a predetermined central point two thin spur gears 258 (Fig. 6) are mounted to rotate on headed screws 260 and arranged to mesh with each other. As shown in Fig. 9, the screws 260 are mounted in opposite end portions of a crosshead 262 fixed to the forward portion of the arms 248. Each of the gears 258 is operatively connected to one of the fingers 234 by a link 264 pivoted at one end thereof on a headed screw near the periphery of the gear and at its opposite end on a pin 266 mounted in the forward portion of the finger. In order to provide for equal and opposite movement of the fingers 236 toward and from the focal point of the fingers 234 two gears 268 which are preferably identical to the gears 258 are mounted to rotate on the screws 260 and positioned beneath the gears 258, said gears 268 being operatively connected to the fingers 236 by links 270. In order to facilitate the mounting of the outsole 230 and the last 232 on the work supporting plate 40 and to permit the retraction of the fingers preparatory to the upper tensioning operations a bent hand lever 272 is pivotally mounted on a headed screw 274 (Fig. 1) at the lower end of a rod 276 extending downwardly from the rear portion of the base plate 68 of the toe head. At its inner portion the hand lever 272 carries a roll 278 conveniently arranged for engagement with the rear portions 240 (Fig. 6) of the two fingers 234 and 236 at the right side of the machine and at its outer end portion the hand lever has mounted thereon a handle 280 (Fig. 1) extending upwardly from the lever for convenient engagement by the operator. When there is no work in the machine the fingers 234 and 236 are limited as to movement of their work engaging ends toward each other by the engagement of a boss 282 (Fig. 6) on the rear portion 240 of the finger 234 at the left side of the machine with the edge face of a fixed plate 284.

Referring to Figs. 12 and 13, the illustrated toe lasting wiper assembly comprises a pair of wiper plates 286 which are mounted to advance bodily as a unit toward the toe end of the shoe until their adjacent central portions engage the toe end portion of a shoe upper mounted on a last in the machine. When the central portions of the wiping edges come into contact with the upper, bodily movement of the wipers is arrested and the wipers close on the toe portion of the upper by relative angular movement about a fulcrum coinciding with the butting points of the wipers. The wiping edges of the wipers are so shaped that upon the completion of the closing movement of the wipers their wiping edges conform substantially to the periphery of the toe portion of the last. As shown in Figs. 12 and 15, the toe wiper plates 286 are removably attached to a pair of wiper carriers 288 by screws 290. As shown in Fig. 13, each wiper carrier has a dovetail tongue 292 extending upwardly therefrom, each tongue having the curvature and disposition of an arc struck from an axis coinciding with the butting points of the wipers. As shown in Fig. 15, the tongues 292 are slidably mounted in complementally shaped grooves formed in the forward end portion of a slide 294. To provide for movement of the slide toward and from the toe end of a shoe in the machine the slide has flanges or tongues 296 extending outwardly from opposite sides thereof for engagement in grooves formed in parallel rails 298 attached by screws 300 (Fig. 4) to the base plate 68. Referring to Fig. 12, the rear end portions of the wiper carriers are supported by flanges 302 extending forwardly from a downward extension of the forward portion of the slide 294. The slide is normally held in its retracted position shown in Figs. 12 and 13 by two springs 306 the forward ends of which are anchored to pins 308 projecting outwardly from the downward extension 304 and anchored at their rear ends to pins 310 projecting downwardly from a crossbar 312 fixed to the rear end faces of the rails 298. While the springs 306 are adequate to hold the slide 294 in its retracted position they cannot be relied upon to effect the return movement of the slide. In the illustrated organization the springs are assisted in returning the slide to its retracted position by the manual operation of a hand lever 664. Referring to Fig. 3, the hand lever is pivotally mounted on a headed screw 666 projecting upwardly from the base plate 68. The hand lever is slotted longitudinally to receive a pin 668 projecting upwardly from the rear portion of the slide 294. The wiper plates 286 are normally held in their open position shown in Figs. 12 and 13 by two springs 314 mounted in sockets extending inwardly from the rearwardly converging outer side faces of the wiper carriers 288, said springs bearing at their outer ends against parallel plates 316 secured by screws 318 (Fig. 15) to the forward portion of the slide 294. The springs 314 urge the wipers into their position shown in Figs. 12 and 13, said position being determined by the mutual engagement of the inner side edges of the wiper plates. For actuating the toe wiper plates 286 pressure fluid, preferably compressed air, is transmitted through an air hose 320 (Fig. 12) and a nipple 322 mounted in the crossbar 312 to a cylinder 324. For mounting the cylinder 324 its rear end wall is drilled and tapped for attachment to a threaded extension of the nipple 322. Slidably mounted in the cylinder is a piston 326 having pivoted to its forward end a connecting rod 328. Referring to Fig. 13, the connecting rod extends freely through an opening 330 in the downward extension 304 of the slide 294 and its forward portion is supported in adjacent rabbeted portions 332 of the wiper carriers. At its forward end the connecting rod is provided with a head 334 having an arcuate forward end face which bears against forwardly converging surfaces 336 of the rabbets 332 which provide cam faces against which the head 334 operates to close the wiper plates on the toe portion of the shoe after bodily movement of the wipers has been arrested by the engagement of their wiping edges with the central portion of the toe end of the shoe. The head 334 of the connecting rod is retained in its position relatively to the wiper carriers, shown in Fig. 13, by two pins 338 mounted in the wiper carriers 288, respectively and extending inwardly from the walls of the rabbets 332 for engagement with the rear faces of the head 334. The toe wiper plates 286 are maintained in their position shown in Fig. 12 when the machine is at rest. In this position the contiguous inner side edges of the wiper plates are arranged in a position of alinement with the longitudinal median line of the forepart of a shoe in the machine, this position of the wipers being assured by the engagement of the rear end portions of the wiper carriers 288 with a stop herein illustrated as a tongue 340 extending forwardly from the central portion of the downward extension 304 of the slide 294.

Figure 27:
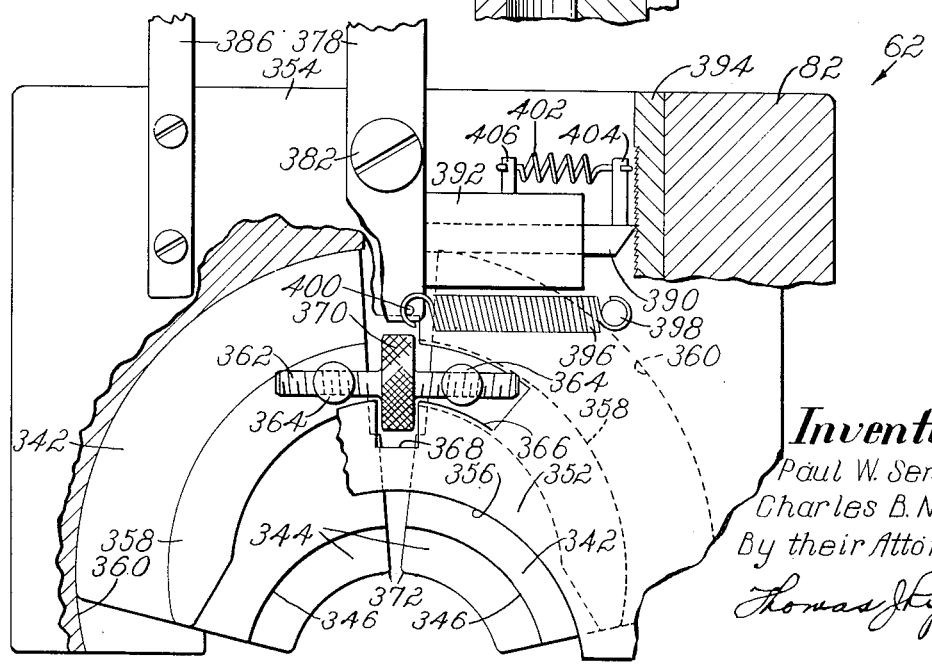
Fig. 27 is an enlarged bottom view of parts of the heel head and particularly the plates for locating the heel portion of a sole.

Referring to Fig. 1, the heel head 62 has mounted therein heel end lasting wiper mechanism and also mechanism for locating and maintaining the heel end portion of a sole on the plate 40 in predetermined relation to the operating instrumentalities of the machine. Referring to Fig. 27, the sole locating means comprises a pair of plates 342 having the same general construction as heel end wiper plates. As shown in Fig. 11, each of the plates 342 has a thin marginal portion 344 of uniform width formed by rabbeting the bottom portion of the margin of the plate. The rabbet terminates in a square shoulder 346 against which the edge face of a sole, such, for example, as the outsole 230, is brought to bear to locate it lengthwise thereof on the supporting plate 40 and to locate its heel end portion widthwise thereof on the plate. At the stage in the operation of the machine when the outsole is positioned on the plate 40 and brought into engagement with the locating plates 342 said plates are the only means effective to locate the sole on the supporting plate. If desired, the heel head may be caused to move downwardly under spring action in order to cause the margins of the plates 342 to apply pressure to the margin of the sole in order to maintain it in its position shown in Fig. 11. The heel locating plates 342 are mounted between top and bottom portions 350 and 352 of a carrier member herein illustrated as a flat plate 354 (Fig. 26 and 27) which has formed therein a recess 356 (Fig. 6) which provides clearance for the operation of the plates 342. As shown in Fig. 27, the plates 342 are segmental in shape and have their arcuate outer edge faces arranged in sliding engagement with complementally shaped walls 360 having their axes of curvature substantially coincidental with the adjacent corners of the thin portions 344 of the plates 342. Each of the plates 342 has an arcuate tongue 358 having an axis of curvature coinciding substantially with the adjacent corners of the thin marginal portions of the plates. The tongues 358 are slidably mounted in complementally shaped grooves formed in the bottom portion 352 of the carrier plate. The plates are adjustable relatively to each other by angular movement about the common axis of the tongues 358 in order to adjust the rabbeted margins of the plates to receive soles of different sizes. Such adjustment of the plates 342 is effected by turning a right and left threaded screw 362 (Fig. 27) mounted in tapped holes extending diametrically through pins 364 swiveled in the tongues 358. The pins 364 extend downwardly from the tongues through arcuate open-ended slots 366 formed in the bottom portion of the carrier plate 354 and communicating with a rectangular opening 368 formed in the carrier plate and centrally located between its sides. The opening 368 provides clearance for the manipulation of a knurled head 370 in the central portion of the screw 362 and the screw is held against appreciable longitudinal movement by the engagement of the head 370 with the side walls of the opening 368. The carrier plate 354 is slidably mounted in a guideway 374 (Fig. 26) in the crosshead 82 for rectilinear movement in the direction of the length of a shoe in the machine to adjust the locating plates 342 in accordance with the size of the shoe to be operated upon. To facilitate the movement of the carrier plate a handle 378 having a downturned grip 380 (Fig. 1) is pivotally mounted on a headed screw 382 extending upwardly into the bottom of the carrier plate at a point in its forward margin midway between its opposite side faces. The adjustment of the sliding assembly is indicated by a pointer or finger 384 projecting upwardly from a bar 386 (Fig. 26) fixed to the bottom of the carrier plate and extending forwardly therefrom. The upper portion of the finger is bent laterally downwardly and pointed to register with a scale (Fig. 6) on the upper surface of a rail 442, said scale indicating in terms of shoe sizes the adjustive position of the sliding assembly. In order to hold the sliding assembly in adjusted position a detent 390 (Fig. 27) in the form of a rectilinear bar with a tooth formed at one end thereof is slidably mounted in a groove in a block 392 fixed to the bottom of the carrier plate 354. The detent moves widthwise of the carrier plate toward and from a ratchet 394 fixed in a rabbet in the crosshead 82. The detent 390 is urged into ratchet engaging position by a spring 396 one end of which is anchored to a pin 398 projecting downwardly from the carrier plate and the other end of which is anchored to a pin 400 extending downwardly from the rear end of the handle 378. The spring urges the handle in a counterclockwise direction, as seen in Fig. 27, and the handle engages the blunt end of the detent and advances it into its ratchet engaging position shown in Fig. 27. When it is desired to adjust the carrier plate 354 the handle 378 is swung slightly in a clockwise direction as seen in Fig. 27, and a spring 402 retracts the detent to disengage it from the ratchet thus to permit adjustive movement of the carrier plate 354. One end of the spring 402 is anchored to a pin 404 projecting forwardly from the detent 390 and the other end is anchored to a pin 406 projecting forwardly from the block 392. To provide clearance for the movement with the carrier 354 of the parts extending downwardly therefrom a recess 408 (Fig. 26) is formed in the crosshead 82. As hereinbefore described, the crosshead 82 has a plate 80 extending downwardly therefrom to which is secured cylindrical members 84 mounted in vertical grooves or guideways in the posts 86. Referring to Fig. 25, the crosshead 82 is urged downwardly by two springs 410 connected at their upper ends to screw eyes 412 extending downwardly from the crosshead and at their lower ends to screw eyes 414 extending upwardly from the base plate 38. For elevating the crosshead 82 to permit a sole to be moved in under the thin marginal portions 344 of the locating plates a disk 416 (Fig. 26) is eccentrically mounted upon a shaft 418 journaled in a bearing in the horizontal portion of an angle bracket 420 fixed to the foremost of the two posts 86. To provide for the operation of the eccentric to elevate the crosshead a straight handlebar 422 is fixed to the shaft 418 and so arranged thereon that the handlebar extends vertically upward when the crosshead is in its elevated position, as shown in Fig. 26.

For wiping the heel end portion of the upper heightwise on the last and for wiping the upper inwardly to form a crease at the junction of the body portion of the upper and its outturned flange the illustrated machine is provided with a pair of heel wipers 424 (Figs. 4 and 10) which are similar in construction and operation to the toe wipers hereinbefore described. To provide for closing movement of the wipers on an axis coincidental with the butting points 426 of the wipers each wiper as a dovetailed tongue 428 extending upwardly therefrom and formed in an arc having its axis at the butting point of the wiper. Referring to Fig. 25 the tongue 428 of each wiper is mounted in a dovetail groove formed in a wiper carrier 430. The wipers are supported at their rear portions on flanges 432 extending toward the heel end of a shoe in the machine from downward extensions 434 of the wiper carrier. The wipers are normally held in their open position by a spring 436 (Fig. 10) mounted in alined grooves 438 in the bottom portions of the wipers, the spring being anchored to pins extending downwardly from each of the wipers. To provide for longitudinal sliding movement of the wiper assembly the wiper carrier is provided with outturned flanges 440 (Fig. 26) mounted in suitable guideways or grooves in rails 442 fixed to a plate 444 secured to the base 82 of the heel head. To hold the carrier 430 against movement away from the heel end of the shoe during the operation of the wiper a pawl 446 (Fig. 2) is pivotally mounted in the upwardly extending bridge portion 448 of a crosshead 450 secured by headed screws 452 (Fig. 26) to the rails 442. Referring to Fig. 2 the pawl operates against a ratchet 454 fixed to the arched central portion of the wiper carrier 430. A spring 456 (Fig. 2) mounted in a socket in the bridge portion 448 of the crosshead urges the pawl 446 in a counterclockwise direction, as seen in Fig. 2, into ratchet engaging position. To provide for manual release of the pawl 446 a thumb plate 458 is formed in a forward extension thereof.

To advance the wiper assembly as a unit into upper engaging position a treadle 460 is pivotally mounted in the base of the machine and has pivotally connected thereto a yoke 462 to which is anchored the lower end of a cable 464 which extends upwardly from the treadle and over a pulley 466 (Fig. 3) fixed to a shaft 468 mounted in a bearing in a boss 470 projecting outwardly from the heel head. At its upper end the cable 464 is anchored to a yoke 472 pivotally mounted at the outer end of a bent lever 474 having its fulcrum on a headed screw 476 projecting upwardly from the plate 444. The inner end portion of the bent lever bears against a small angle bracket 478 fixed to the arched central portion of the wiper carrier 430. The depression of the treadle 460 imparts angular movement to the lever 474 in a clockwise direction as seen in Fig. 3 and thus causes the inner end portion of the lever to bear against the bracket 478 to advance the heel wiper assembly into shoe engaging position. The heel wiper assembly is held in its advanced position by the engagement of the pawl 446 with the ratchet 454 on the wiper carrier. After the completion of the lasting operation the pawl is manually disengaged from the ratchet plate and a pair of springs 480 (Fig. 10) anchored to pins 482 on the wiper carrier return the wiper assembly to its retracted position. In order to apply wiping pressure to the heel wipers 424 after they have been brought into work engaging position by the depression of the treadle 460 fluid pressure is applied to the wipers through mechanism now to be described. For conducting pressure fluid, for example compressed air, to the heel head a hose 484 (Fig. 3) is connected to a crossbar 486 fixed to the forward ends of the rails 442. Fixed to the rear face of the crossbar is a cylinder communicating with the hose 486, a portion of said cylinder being shown in Fig. 25 and identified by the numeral 488. As shown in Fig. 26, the cylinder rests on the base of a recess 490 in the central portion of the plate 444 and the wiper carrier 430 is arched to provide clearance between the carrier and the upper portion of the cylinder. Mounted in the cylinder 488 is a piston having a rod 492 (Fig. 25) extending rearwardly therefrom. Pivotally connected to the end portion of the rod 492 is a member 494 having at its rear end a head 496 (Fig. 28) constructed and arranged to bear against rearwardly converging cam faces 498 formed in lands 499 projecting upwardly from the heel wipers 424. Fluid pressure exerted against the piston advances the wipers bodily as a unit until the resistance of the work to bodily advancement of the wipers overcomes the tension of the spring 436 whereupon the head 496 moves relatively to the wipers, thus closing the wipers on the heel end portion of the shoe. During the initial advancement of the wiper head by the depression of the treadle 460 the piston is advanced through the cylinder 488 by the engagement of pins 500 in the wipers 424 with the head 496 of the member 494 which, it will be remembered, is connected to the piston rod 492.

For lasting opposite side portions of stitchdown shoes the illustrated machine is provided with a wiper assembly 502 (Fig. 3) constructed and arranged to operate on the left side of a shoe in the machine and a similar wiper assembly 504 constructed and arranged to operate on the right side of the shoe. The wiper assembly 502 is mounted in a wiper carrier 506 and the wiper assembly 504 is mounted in a similar carrier 508 at the right side of the machine. The wiper assemblies are substantially identical except that one is arranged to operate at the left and the other at the right side of the shoe and consequently the following description of the left assembly will be understood to apply equally well to the wiper assembly at the right side of the shoe. Referring to Fig. 18, the wiper assembly 502 comprises a plurality of wiper fingers one of which is identified by the numeral 510. As shown in Fig. 17, the fingers stand on edge and are arranged in contiguous relation to each other. Referring again to Fig. 18, the wiper carrier 506 is a boxlike structure having a chamber 512 within which the wiper assembly is mounted, the chamber being open along its inner side to permit the movement of the operating end portions of the wipers into their work engaging position shown in Figs. 4 and 22. Referring again to Fig. 18, the wiper finger 510 has a discoidal outer end portion or hub 514 the diameter of which is substantially identical to the distance from top to bottom of the chamber 512. The discoidal hub 514 permits angular movement of the wiper finger about the axis of the hub and the hub is slidable widthwise of the chamber to permit advancement of the wiper widthwise of the shoe from its position shown in Fig. 18 to its operating position shown in Fig. 22. To provide for the advancement of the wiper assembly from its fully retracted position shown in Fig. 3 into a position in which the wipers are located adjacent to the shoe as shown in Fig. 21, the wiper carrier 506 is slidably mounted for movement widthwise of the shoe. To this end the carrier has two parallel guide members 516 (Fig. 17) substantially square in cross section and arranged to extend downwardly from the base of the carrier. The members 516 are drilled longitudinally to provide cylindrical grooves which engage the cylindrical rails 518 which are slabbed off on the bottom and secured by headed screws 520 to a plate 522. For mounting the plate 522 the bracket 88 (Fig. 23), hereinbefore referred to, extends downwardly from the plate 522 for attachment to the bracket 90 extending upwardly from the base plate 38. To provide for manual advancement of the carrier 506 to bring the wipers into their operating position shown in Fig. 21 a handle 524 is pivotally mounted on a headed screw 526 fixed in the end wall of the carrier. The handle is herein illustrated as a straight tapered bar projecting upwardly from a rectangular base portion 528. For holding the carrier against retracting movement a detent 530 (Fig. 4) is arranged to extend rearwardly from the lower end of the rectangular portion 528 of the handle for engagement with ratchet teeth formed in a bar 532 fixed to the plate 522. The detent is normally held in ratchet engaging position by a spring 534 one end of which is anchored to a pin 536 mounted in the rectangular portion of the handle and the other end of which is anchored to a pin 538 projecting from the end wall of the carrier 506. Referring to Figs. 17 and 18, the wiper fingers are supported substantially midway between their ends on a plurality of flat headed pins one of which is identified by the numeral 540. The pins are slidably mounted in bores uniformly spaced from each other along the inner margin of the base of the carrier and equally distant from the edge of the base portion. The pins are urged upwardly by springs one of which is identified by the numeral 542. The springs surround the pins and are confined between the heads of the pins and the base of a groove 544 formed in the carrier. The springs urge the wiper fingers upwardly into engagement with the bottom edge face of a contour bar 546 arranged in contiguous relation to the vertical inner face of a housing 548 projecting upwardly with an outward inclination from the inner end portion of the carrier. The bottom edge face of the bar 546 has a curvature generally complemental to the profile of the bottom or sole portion of a shoe to be operated upon and serves to arrange the wiping end portions of the wiper fingers in a curved line corresponding generally to the profile of the shoe bottom. For mounting the bar 546 on the housing 548 vertical slots 550 (Fig. 17) are formed in the opposite end portions of the bar to receive headed screws 552 extending through the slots and fixed in the housing 548. The position of the contour bar 546 heightwise of a shoe in the machine is determined by the engagement of the upper edge face of the bar with two short arms 554 fixed to a shaft 556 mounted to rotate in bearings in two brackets 558 secured to the housing 548 by headed screws 560 extending through slots 562 formed in the brackets. The brackets 558 are arranged at opposite sides of and in contiguous relation to the arms 554 and thus serve to hold the shaft 556 against endwise movement. In order to provide for an adjustment of the contour bar 546 heightwise of a shoe in the machine the arms 554 are adjustable from their position in Fig. 17 to their position shown in Fig. 18 by rotation of the shaft 556 which may conveniently be effected by the operation of a hand lever 564 fixed to an extension of the shaft. Inasmuch as the springs 542 hold the wiper fingers 510 and the contour bar 546 at the limits of their respective upward movements it will be seen that the adjustment of the contour bar serves to adjust the initial or rest position of the wiper fingers heightwise of the shoe. This adjustment is made in adjusting the machine for operation on different ranges of shoe sizes. The illustrated arms 554 have only two abutment surfaces constructed and arranged to engage the contour bar and therefore contemplate only two adjustive positions of the bar, but it will be understood that, if desired, the arms 554 could be provided with more than two abutment surfaces in order to provide for a closer adjustment of the contour bar.

In the operaton of the illustrated side wiper assembly the wiper fingers 510 are advanced longitudinally and are swung on the axes defined by their discoidal hubs to cause them to wipe the upper heightwise of the last toward the margin of the outsole on which the last is mouned. The advancement of the wipers longitudinally, or widthwise of the shoe, is effected by the inflation of a bladder 568 (Fig. 18) mounted in the outer portion of the wiper carrier 506 and the angular movement of the wipers is effected by the inflation of a bladder 570 mounted in the upper portion of the housing 548. The bladder 568 extends in a direction generally parallel to the longitudinal median line of a shoe in the machine from end to end of the carrier 506 and is confined by the top and bottom and the outer wall of the carrier and by a plurality of plates 572 mounted on edge and arranged between the wiper fingers and the bladder in contiguous relation to each other and being the same in number as the wiper fingers. When the wipers are advanced without a shoe in the machine their advancement is limited by the engagement of a shoulder 574 in each of the plates 572 with a stop member herein illustrated as a bar 576 fixed in a groove in the bottom surface of the top plate of the carrier. It will be understood that when the wipers are operated with a shoe in the machine each wiper finger will advance until it is arrested by its engagement with the work and the bladder 568 will continue to expand until all of the wiper fingers have been brought into upper engaging position whatever may be the size or shape of the shoe in the machine. It will also be seen that all of the wiper fingers will receive the same wiping pressure from the inflation of the bladder regardless of the extent of their advancement. The illustrated organization provides a side wiper assembly which will operate on all sizes and shapes of shoes in the run of sizes for which the machine is constructed without changing the wipers and without any adjustment of the wipers in the machine other than that effected by the adjustment of the contour bar. The bladder 570 which imparts angular movement to the wiper fingers extends the full length of the wiper assembly and acts on the wipers through a plurality of flat T-shaped plates 578 having their heads arranged in engagement with the bottom of the bladder and their stem portions slidably mounted in a slot 580 extending through the base of the housing and communicating with the inner end portion of the chamber in the wiper carrier. The plates 578 are arranged in contiguous relation to each other with the rounded ends of their stem portions in contact with the upper edges of the wiper fingers, said plates being the same in number as the fingers. It will be understood that the bladder 570 continues to expand until all of the wiper fingers come to rest in the position indicated in Fig. 19 with the outturned margin 582 of the upper pressed against the outwardly extending margin of the outsole by the pressure of the bladder against the wiper fingers. For retracting the wiper fingers to their rest position indicated in Fig. 18 two arms 584 are fixed to opposite end portions of a shaft 586 mounted to rotate in suitable bores in parallel webs 588 extending between and formed integrally with the carrier 506 and the housing 548. The arms 584 have open-ended solts 590 in their lower end portions which receive the opposite end portions of a rod 592 extending through alined slots 594 in the wiper fingers 510 and through similar slots in the walls 596 (Fig. 4) which close the opposite end portions of the carrier 506 and the housing 548. For rotating the shaft 586 in a clockwise direction, as seen in Fig. 18, to retract the wiper assembly an angular lever 598 is fixed to the shaft and provide with a head 600 conveniently arranged to be depressed by the hand of the operator. In order to prevent excessive strain on the brackets 88 and 90 (Fig. 23) by the upward pressure of the bladder 572 against the top of the housing 548 a post 602 is secured to the base plate 38 and provided at its upper end with a cross pin 604 (Fig. 17) on which are rotatably mounted two rolls 606. During the advancement of the carrier 506 to bring the wipers into shoe engaging position a channel member 608 fixed to the bottom of the carrier and extending downwardly therefrom advances relatively to the rolls until inwardly extending flanges 610 in the lower portion of the channel member engage the rolls 606, as shown in Fig. 17, to prevent upward movement of the inner portion of the carrier.

In the operation of the illustrated machine the inner surface of the bottom margin of an upper such as the upper 612 illustrated in Figs. 19 and 20 and the upper surface of the margin of an outsole 230 are coated with pressure sensitive cement to cause them to be bonded together in the lasting operation. In order to prevent inadvertent contact of the cemented surface of the upper with the cemented surface of the outsole before the completion of the lasting operation a pair of pins 616 are arranged to engage the inner surface of the upper as shown in Fig. 20 and to hold it out of contact with the margin of the outsole until the side wiper fingers operating in conjunction with the work supoprting plate 40 bring the upper into its position shown in Fig. 19. Referring to Fig. 25, each of the pins 616 is slidably mounted in a bore extending longitudinally of a plate 618 arranged to extend heightwise of a shoe in the machine and secured to the base portion 42 of the work supporting plate 40 by screws 620. Each pin 616 is normally held at the limit of its upward movement in the plate 618 by a spring 622 mounted in a counterbore in the lower portion of the plate and confined between a flat head 624 at the lower end of the pin and a screw plug 626 in the tapped lower portion of the counterbore. Referring to Fig. 6, the illustrated pins 616 are located at opposite sides of the shank portion of the shoe and serve to hold the opposite sides of the lasting margin out of contact with the outsole during the lasing operation. For performing the same function at the toe end of the shoe the last locating fingers 234 have their last engaging end portions 628 enlarged for engagement with the cement coated surface of the lasting margin of the upper during the lasting operation. Just before the completion of the lasting operation the fingers 234 are withdrawn from their position shown in Fig. 6 to permit the margin of the upper to be brought into contact with the cement coated margin of the outsole. At the heel end of the shoe the upper surfaces of the inner margins of the sole locating plates 342 serve to hold the lasting margin of the upper out of contact with the cement coated margin of the outsole during the lasting operation, said plates being retracted upon the completion of the lasting operation to permit contact of the lasting margin of the upper with the margin of the outsole.

For adjusting the assembly of operating instrumentalities at the toe end of the shoe, comprising the toe wipers, the toe grippers and the side grippers, toward or from the heel head 62 in accordance with the size of a shoe to be operated upon the illustrated machine is provided with means for adjusting the supporting assembly including the plate 70 (Figs. 1 and 9) and the two sleeves 72 longitudinally of the rails 74. As shown in Fig. 1, the illustrated adjusting mechanism comprises a manually operated screw 630 having a hand wheel 632 fixed to its outer end and swiveled at its inner end in a socket at one end of a link 634 which is pivotally connected at its opposite end to a bracket 636 fixed to the plate 70. The screw 630 operates in a tapped hole extending diametrically through the central portion of a shaft 638 mounted to rotate freely in a yoke 640 secured to a plate 642 fixed to the rear portion of the base plate 38. For indicating the adjustment of the operating instrumentalities above referred to in terms of shoe sizes an indicator or finger 644 is fixed to the link 634 and arranged to register with a scale 646 fixed to the upper surface of the base plate 38.

For actuating the upper shaping instrumentalities of the illustrated machine a pneumatic pump 722 (Fig. 29) transmits compressed air through an accumulator 650 and a manually operated rotary valve 652 which is rotated to select the lines through which air pressure is delivered.

As herein illustrated the machine performs a lasting operation on a two sole stitchdown shoe in the run of juvenile sizes. The shoe is prepared for the operation of the illustrated machine by lasting the lining 654 (Figs. 19 and 20) inwardly over an insole 656 about the entire periphery of the shoe bottom, leaving the upper free to be turned outwardly and lasted by the operating instrumentalities of the illustrated machine. An outsole such, for example as the outsole 230 illustrated in Figs. 19 and 20, which may or may not have been prerounded and has a coating of pressure sensitive cement on its upper attaching surface is mounted on the sole supporting plate 40. Referring to Fig. 6, the heel locating plates 342 will have been located lengthwise of the plate 40 in accordance with the size of the shoe to be operated upon by adjusting the carrier 354 into a position determined by the registration of the indicator finger 384 with the numerals on the heel head and the sole locating assembly will be held in adjusted position by the engagement of the pawl 390 (Fig. 27) with the ratchet 394. Referring to Fig. 11, the outsole is inserted into the space between the plate 40 and the thin marginal portions 344 of the sole locating plates 342 which will have been adjusted to the contour of the heel portion of the sole by the operation of the right and left screw 362 illustrated in Fig. 27. The last with the lined upper and insole mounted thereon is then placed in generally upright position on the outsole and is located relatively to the outsole at the heel portion of the shoe by bringing the heel end of the lining into engagement with the edges of the locating plates 342. The toe portions of the last and upper on the one hand and the outsole on the other hand are located widthwise thereof relatively to each other and relatively to the plate 40 by bringing the fingers 234 into engagement with the toe portion of the last at points just above the last bottom and by bringing the fingers 236 into engagement with the margin of the outsole at opposite sides of its toe portion. The bottom margin of the upper at the toe portion of the shoe rests upon the enlarged end portions 628 of the fingers 234 which serve to prevent premature contact of the cement coated margin of the upper with the cement coated margin of the outsole. In mounting the last and the upper upon the supporting plate 40 the operator causes the opposite side portions of the upper to flare outwardly from the last for engagement with the outer portions of the pins 616 which serve to prevent premature contact of the cement coated margin of the upper with the outsole along its opposite sides. The heel end portion of the upper is held out of contact with the margin of the heel end portion of the sole by the heel locating plates 342 which are then in their position shown in Fig. 6. Referring to Fig. 3, the heel holddown 94 is swung into position to engage the flat cone face at the heel portion of the last in order to hold the last against upward movement during the operations of the wipers, the holddown being manually elevated against the pressure of the spring 102 (Fig. 1) to permit it to advance into its operating position. The operator may adjust the holddown lengthwise of the last as required by moving the slide 96 relatively to the arm 98 and the slide is retained in its adjusted position by annular friction elements 658 mounted on headed screws 660 which extend upwardly from the arm 98 through a longitudinal slot in the slide 96. The friction elements are pressed against the slide by springs 662 surrounding the screws. If adjustment of the toe head in accordance with the size of the shoe to be operated upon is required, such adjustment is made at this time by the operation of the hand screw 630 (Fig. 1), the adjustment being determined by the registration of the indicator finger 644 with the scale 646. The lasting margin at the toe end of the upper is then inserted into the gripper jaws 56, 57 and the lasting margin at opposite sides of the forepart of the upper is inserted into the gripper jaws 58, 59 preparatory to the upper tensioning and shaping operations which occur immediately thereafter and are performed partly by fluid pressure operated mechanism and partly by manually operated mechanism. In the illustrated organization the fluid pressure operated mechanism is controlled by the rotary valve 652 which is constructed and arranged to be operated step by step by the manipulation of a handle 700 (Fig. 37) in order to effect the performance in sequence of certain of the upper tensioning and upper shaping operations. The illustrated valve, which is constructed and arranged for the transmission of compressed air as the pressure fluid medium, comprises a tubular casing 702 (Fig. 1) fixed to a bracket 704 secured to the head 32 by screws 706. Mounted in the casing is a rotary valve body 710 (Fig. 36) having an axial stem 712 (Fig. 37) fixed therein and projecting upwardly therefrom through a head 714 formed in the casing. That portion of the stem projecting above the head provides a mounting for the hub 716 of the handle 700. In the illustrated organization the casing 702 is open at the bottom and the valve body 710 has a vertical bore 718 extending upwardly from its base and providing an intake port for compressed air. Fixed to the base of the valve body and communicating with the port 718 is a flexible hose 720 which conducts compressed air from the pump 722 (Fig. 29). At its upper extremity the bore 718 communicates with a radial bore 724 (Fig. 37) extending outwardly to the periphery of the valve body and communicating with a peripheral groove 726 (Fig. 36) formed in the valve body and communicating through a short vertical groove 728 (Fig. 37) with a relatively short peripheral groove 730 (Fig. 30). The valve body 710 has a vertical bore 732 (Fig. 36) providing an exhaust port. At its upper end the bore 732 communicates with a radial bore 734 projecting outwardly therefrom to the periphery of the valve body and communicating with a peripheral groove 736 in the valve body. There is also provided in the valve body a vertical bore 738 projecting upwardly from the base of the valve body and providing a second exhaust port. At its upper end the bore 738 communicates with a radial bore 740 extending outwardly therefrom to the periphery of the valve body and communicating with a peripheral groove 742 in the valve body. The peripheral groove 726 communicates in sequence with service ports 676, 680, 682, 684 and 688 as the valve body is rotated step by step in the operation of the machine. The service ports extend radially through the valve casing 702 and are uniformly spaced circumferentially about the valve casing. It will be understood that each service port communicates with a pressure line which in turn communicates with an operating instrumentality. The short peripheral groove 730 in the valve body communicates with a service port 692 extending radially through the valve casing 702. The exhaust port 732 communicates with a short peripheral groove 744 in the valve body 710. The exhaust port 732 also communicates with a relatively long peripheral groove 746 which is connected to the short groove 744 by a short vertical groove 748. The short groove 744 provides an exhaust outlet for the line connected to the service port 676 when the valve is in its position indicated in Fig. 34 and the groove 746 provides an exhaust outlet for the line connected to the service port 692 during that interval in the operation of the machine when the valve body is rotating from its position indicated in Fig. 31 to its position at the completion of the machine cycle indicated by Fig. 35.

After inserting the lasting margin at the toe end of the upper into the toe gripper 51 and the lasting margin at opposite sides of the forepart of the upper into the side grippers 53 the valve body 710 is rotated by the operator into its position indicated in Fig. 30 to connect the service port 676 to the pressure line 718. The service port 676 communicates with the flexible hose 156 (Fig. 7) and through the bore 160 in the plunger 138 with the piston 146 which closes the side gripper jaws 58, 59. In the same manner the service port 676 also communicates with a piston for closing the toe gripper jaws 56, 57. After the jaws have thus been closed on the margin of the upper the valve body is rotated by the operator into its position indicated in Fig. 31 to bring the service port 692 into communication with the exhaust port 732 through a line 804 (Fig. 29) and, concomitantly, to bring the service port 680 into communication with the pressure port 718. This service port 680 communicates through a line 166 (Fig. 7) with a port 164 in the housing 118 and through said port with the head of the plunger 138 in the right side gripper 53, moving said plunger to the right as seen in Fig. 7 to cause the grippers to apply tension to the upper. The service line 680 also communicates with the other two gripper assemblies, causing them to be operated in the manner above described. The heel wiper assembly is then advanced into shoe engaging position by the depression of the treadle 460 and the toe wipers are advanced into upper engaging position by the operation of the hand lever 664 (Fig. 3). The operator then rotates the valve into its position shown in Fig. 32 to bring the service port 682 into communication with the pressure line 718. The service port 682 communicates through a line 320 with the toe wipers and through a line 484 with heel wipers and directs fluid pressure to the pistons for closing the wipers. It will be understood that inasmuch as the shoe supporting plate 40 is at the limit of its downward movement when the toe wipers and heel wipers are advanced, the wipers engage the upper at points offset heightwise of the upper from the lasting margin. Immediately after the wipers are advanced into upper engaging position, the fingers 234 and 236 (Fig. 6) which locate the last and the outsole widthwise thereof at their toe portions, are manually retracted by the operation of the hand lever 272 to provide clearance for the upward movement of the supporting plate. Each of the side wiper assemblies is then manually advanced into its upper engaging position illustrated in Fig. 21 after first releasing the detent 530 (Fig. 4) from the ratchet 532 by angular movement of the handle 524. Upon the completion of the advancement of the side wiper assemblies the detents again engage the ratchets to hold the wiper assemblies against return movement. The valve 652 is then rotated into its position shown in Fig. 33 to bring a service port 684 into communication with the pressure line 718 thereby directing fluid pressure through a line 800 and an accumulator 810 (Fig. 29) to the bladder 568 in the side wiper assembly 64 at the left side of the machine and through a line 801 to a like bladder in the side wiper assembly 64 at the right side of the machine. The inflation of the bladders causes the wiper fingers in the side wiper assemblies 64 to be advanced into upper engaging position. The valve is then rotated into its position indicated by Fig. 34 to bring the service port 676 into communication with the exhaust port 732 whereupon the spring 152 (Fig. 7) opens the gripper jaws 58, 59 and a like spring opens the gripper jaws 56, 57. The pressure in the service line 680 retracts the grippers immediately after the gripper jaws open thus permitting the upward movement of the blocks 176 from their position in Fig. 7 into their position shown in Figs. 21 and 22 preparatory to the completion of the lasting operations. The operator then depresses the treadle 198 to swing the blocks 176 upwardly into their positions shown in Fig. 21 and further depresses the treadle to elevate the work supporting plate 40 while the toe wipers, the heel wipers and the side wiper fingers continue to advance under fluid pressure and to perform an upwiping operation upon the upper. Upon the completion of the upward movement of the work supporting plate the toggle links 212 and 214 (Fig. 25) lock to hold the plate elevated. The valve is then rotated into its position indicated by Fig. 35 to bring the service port 688 into communication with the pressure line 718. The service port 688 communicates through a line 802 with the bladder 570 (Fig. 18) and through a line 803 with the corresponding bladder at the right side of the machine, inflating the bladders and thereby swinging the side wiper fingers downwardly to wipe the side portions of the upper heightwise of the last and to press the outwardly flanged bottom margin of the upper against the upper surface of the margin of the outsole. During the downward movement of the side wiper fingers the fluid pressure from the service port 684 acting through the bladder 568 (Fig. 18) and the corresponding bladder at the right side of the machine maintains constant endwise pressure on the wiper fingers to cause the fingers to maintain their wiping pressure on the upper during their downward movement. It will be understood that during their downward movement the fingers move endwise thereof relatively to each other as required to cause them to conform to the contours of the opposite side portions of the last. During the downward movement of the side wipers the pins 616 are depressed from their position in Fig. 20 to their position illustrated in Fig. 19 and the sole locating plates 342 (Fig. 27) are manually retracted to permit the contact of the outwardly flanged margin of the upper with the outsole at the heel end of the shoe. Upon the completion of the downward movement of the wiper fingers further pressure thereof against the outwardly flanged margin of the upper causes the cement attachment thereof to the margin of the outsole, thus completing the operations of the illustrated machine.

In the operation of the machine on the smaller sizes in the run of sizes on which the machine is intended to operate the side wiper fingers at opposite ends of the side wiper assemblies assume the position shown in Fig. 5. In this position the side wipers overlying the toe wipers have had their movement widthwise of the shoe arrested by the plates 316 (Fig. 13) fixed to the toe wiper slide 294 and have had their movement heightwise of the shoe arrested by their engagement with the side margins of the wiper plates 286 or with flanges 670 projecting outwardly from the lower portions of the plates 316. Similarly at the heel end of the shoe the side wipers overlying the heel wipers are arrested in their movement widthwise of the shoe by plates 672 (Fig. 28) projecting upwardly from the opposite side margins of the heel wipers 424 and the movement of the wipers heightwise of the shoe is arrested by flanges 674 projecting outwardly from the lower portions of the plates 672.

Upon the completion of the operations of the illustrated machine the operator rotates the valve body 710 in a counterclockwise direction, as seen in Fig. 36, to bring the service ports 688 and 684 into communication with an exhaust port 738 thus releasing the inward pressure on the side wiper fingers and also the pressure on the fingers heightwise of the shoe. The operator then grasps the handle 524 (Fig. 23) and the corresponding handle at the opposite side of the machine and after first swinging the handles in a direction to disengage the detents 530 (Fig. 4) from their ratchets 532 moves the handles outwardly to slide the side wiper assemblies away from the shoe and into their retracted positions shown in Fig. 3. The hand lever 598 and the corresponding hand lever in the opposite side wiper assembly are then operated to retract the side wiper fingers into their positions relatively to the wiper carriers illustrated in Fig. 18. Referring to Fig. 26, the operator then swings the hand lever 422 into its vertical position shown in said figure to cause the eccentric disk 416 to return the heel head 62 to its elevated position thus relieving the pressure of the heel wipers against the outwardly flanged margin of the upper. The operator then grasps the handle 217 (Fig. 25) of the arm 215 and draws it toward him to break the toggle links 212 and 214 thus causing the return of the work supporting plate 40 to its rest position shown in Fig. 25 and causing the return of the blocks 176 to their respective downwardly inclined rest positions shown in Fig. 7. The downward movement of the work supporting plate relieves the pressure of the toe wipers against the outwardly flanged margin at the toe end of the upper and leaves the shoe supported by the toe wipers and the heel wipers which are still in their advanced or closed positions. The operator then rotates the valve body 710 in a counterclockwise direction, as seen in Fig. 36, to return it to its initial position thereby bringing the service ports 682 and 680 into communication with an exhaust port 738 and thus releasing the pressure on the toe wipers and the heel wipers and permitting the springs 306 (Fig. 12) in the toe head and the springs 480 (Fig. 10) in the heel head to retract the wipers. The operator then swings the hand lever 664 (Fig. 3) in a clockwise direction, as seen in said figure, to return the toe wiper assembly to its retracted position. The operator then depresses the thumb plate 458 of the pawl 446 in the heel head to disengage the pawl from the ratchet 454 thus to permit the return of the heel wiper assembly to its retracted position, shown in Fig. 3, by gravity. The shoe is now freely mounted on the work supporting plate 40 and may readily be removed from the machine.

In the foregoing description of the operation of the machine a two-sole stitchdown shoe in which the lining is lasted inwardly over the insole is selected by way of example as the type of shoe on which the operation of the illustrated machine is performed. It should be understood, however, that the illustrated machine is not limited in its utility to operation on shoes of this type but is adapted to be employed in the manufacture of other types of shoes such, for example, as single sole stitchdown shoes or three-sole stitchdown shoes in which the outwardly flange margin of the upper is cemented attached to a midsole preparatory to the attachment of an outsole to the midsole in any known manner.

Having thus described our invention, what we claim as new and desire to secure by Letters Patent of the United States is:

1. In a machine for shaping shoe uppers, the combination with means for supporting in upright position a shoe upper on its last and a sole having a margin extending beyond the edge of the last bottom, of a plurality of wipers, a member within which the wipers are mounted for bodily movement relatively to a shoe in the machine and for swinging movement heightwise of the shoe, power operated means for effecting such bodily movement, and power operated means for effecting such swinging movement independently of the bodily movement thereby to press the outwardly flanged margin of the upper against the margin of the sole.

2. In a machine for shaping shoe uppers, the combination with means for supporting in upright position a shoe upper on its last and a sole having a margin extending beyond the edge of the last bottom, of a plurality of wipers, a member within which the wipers are mounted for bodily movement relatively to a shoe in the machine and for swinging movement heightwise of the shoe, a first actuator for effecting bodily movement of the wipers in unison, and a second actuator for effecting swinging movement of the wipers in unison heightwise of the shoe independently of the bodily movement thereby to press the outwardly flanged margin of the upper against the margin of the sole.

3. In a machine for shaping shoe uppers, a wiper, a member in which the wiper is mounted for angular movement heightwise of a shoe in the machine, a slide mounted in the member and an expander mounted in the member and constructed and arranged to advance the slide thereby to impart a movement of translation to the wiper.

4. In a machine for shaping shoe uppers, a wiper, a member in which the wiper is mounted for swinging movement heightwise of a shoe in the machine, a slide mounted in the member, a bladder mounted in the member, and means for inflating the bladder thereby to cause the slide to impart a movement of translation to the wiper, and a second bladder operable to impart to the wiper a swinging movement heightwise of a shoe in the machine.

5. In a machine for shaping shoe uppers, a wiper, a member in which the wiper is mounted, a first slide mounted in the member and constructed and arranged to impart to the wiper a movement of translation relatively to a shoe in the machine, a second slide for imparting to the wiper a swinging movement heightwise of the shoe, a first bladder for advancing the first slide, a second bladder for advancing the second slide, and means for inflating the bladders.

6. In a machine for shaping shoe uppers, a wiper, a member in which the wiper is mounted, a slide for imparting to the wiper a movement of translation relatively to a shoe in the machine, a stop for limiting the advancement of the slide, a bladder, and means for inflating the bladder to advance the slide.

7. In a machine for shaping shoe uppers, a wiper, a discoidal hub of said wiper, a member having a recess in which the hub is mounted for rotary movement in a plane disposed heightwise of a shoe in the machine and for translatory movements, and means for imparting to the wiper angular movement on the axis of the hub.

8. In a machine for shaping shoe uppers, a wiper comprising an arm and a discoidal hub formed at one end of said arm, and means mounting the hub for rotary and translatory movements.

9. In a machine for shaping shoe uppers, a wiper comprising an arm and a discoidal hub formed at one end of said arm, means mounting the hub for rotary and translatory movements, means for imparting translatory movement to the wiper, and means for imparting to the wiper angular movement on the axis of the hub.

10. In a machine for shaping shoe uppers, a wiper, a discoidal hub formed in said wiper, means for mounting said wiper comprising a chamber open on one side thereof and characterized by parallel surfaces between which the discoidal hub of the wiper is mounted for rotary and translatory movements, a slide mounted in said chamber in contiguous relation to said hub, and pressure fluid actuated means for advancing said slide thereby to impart translatory movement to the wiper.

11. In a machine for shaping shoe uppers, a wiper, a discoidal hub formed in said wiper, means for mounting said wiper comprising a chamber open on one side thereof and characterized by parallel surfaces between which the discoidal hub of the wiper is mounted for rotary and translatory movements, a slide mounted in said chamber in contiguous relation to said hub, a bladder confined between the slide and the adjacent surfaces of the chamber, and means for inflating the bladder to advance the slide thereby to impart translatory movement to the wiper.

12. In a machine for shaping shoe uppers, a wiper, a discoidal hub formed in said wiper, means for mounting said wiper comprising a chamber characterized by an opening through which the wiper projects and characterized by parallel surfaces between which the discoidal hub of the wiper is mounted for rotary and translatory movements, a slide mounted in said chamber in contiguous relation to said hub, a bladder confined between the slide and the adjacent surfaces of the chamber, means for inflating the bladder to advance the slide thereby to impart translatory movement to the wiper, a plunger constructed and arranged to impart to the wiper angular movement on the axis of the discoidal hub thereof, and pressure fluid actuated means for advancing the plunger.

13. In a machine for shaping shoe uppers, a wiper, a discoidal hub formed in said wiper, means for mounting said wiper comprising a first chamber open on one side thereof and characterized by parallel surfaces between which the discoidal hub of the wiper is mounted for rotary and translatory movements, a slide mounted in said first chamber in contiguous relation to said hub, a first bladder confined between the slide and the adjacent surfaces of the first chamber, a plunger constructed and arranged to impart to the wiper angular movement on the axis of the discoidal hub thereof, a second chamber in which the plunger is mounted, a second bladder mounted in the second chamber and arranged to bear against the plunger, and means for inflating the bladders.

14. In a machine for shaping shoe uppers, the combination with means for supporting in upright position a shoe upper on its last and a sole having a margin extending beyond the edge of the last bottom, of a plurality of wipers, a member in which the wipers are mounted for bodily movement relatively to a shoe upper in the machine and for swinging movement independently of each other heightwise of the shoe in order to press an outwardly flanged margin of the upper against the outwardly extending margin of the sole, a contour bar for limiting such swinging movement of the wipers in one direction, said contour bar being adjustable heightwise of the shoe, and an adjustable member having a plurality of abutment surfaces for determining a plurality of constant adjustive positions of the contour bar.

15. In a machine for shaping shoe uppers, the combination with means for supporting in upright position a shoe upper on its last and a sole having a margin extending beyond the edge of the last bottom, of a plurality of wipers, a member in which the wipers are mounted for bodily movement relatively to a shoe upper in the machine and for swinging movement independently of each other heightwise of the shoe in order to press an outwardly flanged margin of the upper against the outwardly extending margin of the sole, a contour bar for limiting such swinging movement of the wipers in one direction, said contour bar having a profile generally complemental to the profile of a shoe bottom, said contour bar being adjustable heightwise of the shoe, an adjustable member having a plurality of abutment surfaces for determining alternatively a plurality of constant adjustive positions of the contour bar, and means for rotating the adjustable member to select one of its abutment surfaces for presentation to the contour bar.

16. In a machine for shaping shoe uppers, a wiper, a member within which the wiper is mounted for bodily movement relatively to a shoe in the machine and for swinging movement heightwise of the shoe, a first actuator for effecting bodily movement of the wiper in one direction, a second actuator for effecting bodily movement of the wiper in the opposite direction, and a third actuator for effecting swinging movement of the wiper heightwise of the shoe.

17. In a machine for shaping shoe uppers, a wiper, a member in which the wiper is mounted for bodily movement relatively to a shoe in the machine and for swinging movement heightwise of the shoe, power operated means for effecting bodily movement of the wiper in one direction, manually operated means for effecting bodily movement of the wiper in the opposite direction, and an actuator for effecting swinging movement of the wiper heightwise of the shoe.

18. In a machine for shaping shoe uppers, a plurality of wipers have alined slots formed therein and extending generally longitudinally thereof, a first member in which the wipers are mounted for bodily movement relatively to a shoe in the machine, an actuator for effecting bodily movement of the wipers in one direction, a second member extending through the alined slots in the wipers, and means constructed and arranged to actuate said second member thereby to effect bodily movement of the wipers in the opposite direction.

19. In a machine for shaping shoe uppers, a plurality of wiper members having alined openings formed therein, an actuator for effecting bodily movement of the wiper members in one direction, a member extending through the alined openings in the wiper members and freely mounted therein, and means for actuating said member to effect bodily movement of the wiper members in the opposite direction.

20. In a machine for shaping shoe uppers, a plurality of wiper fingers having alined openings formed therein, means for effecting bodily movement of the wiper fingers in one direction, a bar extending through the alined openings in the wiper fingers, and manually operated means for actuating the bar to effect bodily movement of the wiper fingers in the opposite direction.

21. In a machine for shaping shoe uppers, a plurality of wiper fingers having alined openings formed therein, power operated means for effecting bodily movement of the wiper fingers in one direction, a bar extending through the alined openings in the wiper fingers, and means including a hand lever for actuating the bar to effect bodily movement of the wiper fingers in the opposite direction.

22. In a machine for shaping shoe uppers, a plurality of wiper fingers having slots formed therein, power operated means for advancing the wiper fingers independently of each other into positions determined by the engagement of the respective fingers with the periphery of a shoe in the machine, a bar extending through the slots in the fingers, and means for actuating the bar to retract the wiper fingers.

23. In a machine for shaping shoe uppers, a plurality of wiper fingers, a first actuator for advancing the fingers independently of each other into positions determined by the engagement of the fingers with the periphery of a shoe in the machine, and a second actuator for swinging the fingers independently of each other heightwise of the shoe into positions determined by the engagement of the fingers with an outwardly extending portion of the shoe.

24. In a machine for shaping shoe uppers, a plurality of wiper fingers, a first actuator for advancing the fingers independently of each other into positions determined by the engagement of the fingers with the periphery of a shoe in the machine, a second actuator for swinging the fingers independently of each other heightwise of the shoe into positions determined by the engagement of the fingers with an outwardly extending portion of the shoe, and means for swinging the fingers heightwise of the shoe in the opposite direction to disengage them from said outwardly extending portion.

25. In a machine for shaping shoe uppers, a pair of end lasting wipers, a slide on which the wipers are mounted, a plunger for advancing the slide lengthwise of a shoe in the machine, a plurality of side wipers, a member in which the side wipers are carried, means for advancing the side wipers widthwise of the shoe relatively to the member, and means for swinging the side wipers heightwise of the shoe relatively to each other and to the member.

26. In a machine for shaping shoe uppers, a pair of end lasting wipers, a slide on which the wipers are mounted, a plunger for advancing the slide lengthwise of the shoe, power operated means for advancing the plunger and resilient means for retracting the slide, a plurality of side wiper fingers, means for advancing the fingers widthwise of the shoe, and means for swinging the fingers heightwise of the shoe.

27. In a machine for shaping shoe uppers, the combination with multiple side wipers, of an end lasting wiper, and an abutment constructed and arranged to arrest the advancement of a portion only of the side wipers.

28. In a machine for shaping shoe uppers, the combination with an assembly of side wiper members extending lengthwise of a shoe in the machine beyond the extremities of the shoe, of an end lasting wiper characterized by an abutment formed thereon and constructed and arranged to arrest the advancement of those side wipers extending beyond the extremities of the shoe.

29. In a machine for shaping shoe uppers, the combination with an assembly of side wiper fingers, of an end lasting wiper characterized by an upstanding abutment member formed on its outer side margin and constructed and arranged to arrest the advancement of those side wiper fingers having paths of movement in which the abutment member is positioned.

30. In a machine for shaping shoe uppers, the combination with an assembly of side wiper fingers at each side of a shoe in the machine, of a pair of end lasting wipers each characterized by an upstanding flange on its outer side margin providing an abutment for arresting the advancement of those side wiper fingers having paths of movement in which the flange is positioned.

31. In a machine for shaping shoe uppers, a wiper plate having a work engaging edge, said wiper being characterized by a flange offset from the work engaging edge, said flange projecting upwardly from the wiper plate and being arranged to provide an abutment member for arresting the advancement of other operating instrumentalities.

32. In a machine for shaping shoe uppers, a lasting wiper plate having a flange constructed and arranged to arrest the advancement of another operating instrumentality and having a land characterized by a cam surface constructed and arranged to be engaged by a wiper actuating member.

33. In a machine for shaping shoe uppers, a pair of end lasting wiper plates each characterized by a land having formed therein a cam surface, the cam surfaces of the two wipers being arranged relatively to each other so as to receive a wedge member for actuating the wipers simultaneously, and means for guiding the wiper plates for advancement by the wedge member in arcuate paths having a common center of curvature at the junction of the wiping edges of the wiper plates, said wiper plates being further characterized by flanges in the outer side margins of the plates respectively constructed and arranged to arrest the advancement of other operating instrumentalities.

34. In a machine for shaping shoe uppers, a pair of end lasting wiper plates each characterized by a land having formed therein a cam surface, the cam surfaces of the two wipers being arranged relatively to each other so as to receive a wedge member for actuating the wipers simultaneously, means for guiding the wiper plates for advancement by the wedge member in arcuate paths having a common center of curvature at the junction of the wiping edges of the wiper plates, and resilient means carried by the wipers and constructed and arranged to retract the wipers when the wedge member is retracted.

35. In a machine for shaping shoe uppers over lasts, the combination with a gripper for tensioning an upper over a last, of a support for the last comprising a plate having the general shape of a last bottom, said plate being characterized by the provision therein of a marginal recess providing clearance for the operation of the gripper, and means operable to close the recess.

36. In a machine for shaping shoe uppers over lasts, the combination with a toe gripper and a pair of side grippers constructed and arranged to operate at opposite sides of a shoe in the machine, of a support for a last comprising a sole shaped plate characterized by the provision therein of three marginal recesses providing clearance for the operation of the toe gripper and the pair of side grippers, and means operable to close the recesses.

37. In a machine for shaping shoe uppers over lasts, the combination with means for tensioning an upper over a last, of a plate for supporting a shoe sole and a last mounted thereon, said plate being characterized by the provision therein of an opening providing clearance for the operation of the tensioning means, a member for closing said opening, and means for advancing said member to close the opening.

38. In a machine for shaping shoe uppers over lasts, the combination with means for tensioning an upper over a last, of a plate for supporting a shoe sole and a last mounted thereon, said plate being characterized by the provision therein of an opening providing clearance for the operation of the tensioning means, means for closing said opening comprising a member hinged on the plate, and means for operating said member to close the opening.

39. In a machine for shaping shoe uppers over lasts, the combination with means for tensioning an upper over a last, of a plate for supporting a last and a shoe sole attached thereto, said plate being characterized by the provision therein of a notch providing clearance for the operation of the tensioning means, a notch closing member hinged between side walls of the notch and serving as part of the work supporting means when in its notch closing position, and means for advancing said member from a normal depending position into its notch closing position.

40. In a machine for shaping shoe uppers over lasts, the combination with means for tensioning an upper over a last, of a plate for supporting a last and a shoe sole attached thereto, means mounting said plate for movement heightwise of a last supported thereon, said plate being characterized by the provision therein of a notch providing clearance for the operation of the tensioning means, a notch closing member, and means for advancing said member to close the notch and for moving the plate heightwise of the last supported thereon in order to bring the upper on the last into position to be acted upon by operating instrumentalities.

41. In a machine for shaping shoe uppers over lasts, the combination with means for tensioning an upper over a last, of a support for the last comprising a sole shaped plate, said plate being characterized by the provision therein of an opening providing clearance for the operation of the tensioning means and by the provision of means operable to close the opening, an actuator for operating said closing means and for moving the plate to bring the upper into position to be acted upon by operating instrumentalities, and manually operated means for operating said actuator.

42. In a machine for shaping shoe uppers over lasts, the combination with a gripper for tensioning an upper over a last, of a sole shaped plate for supporting a last and an extension sole having cement applied to the margin of its last facing surface, a plurality of wipers for wiping the upper heightwise of the last and for bringing the outwardly flanged margin of the upper into contact with the cement treated margin of the extension sole, and means for holding the upper out of contact with the cement treated margin of the sole during the initial advancement of the wipers.

43. In a machine for shaping shoe uppers over lasts, the combination with a plate for supporting a last and an extension sole having cement applied to the margin of its last facing surface, of a plurality of wipers for wiping the upper heightwise of the last and for bringing the outwardly flanged margin of the upper into contact with the cement treated margin of the extension sole, and a plurality of members for holding the entire outwardly flanged margin of the upper out of contact with the cement treated margin of the sole during the initial advancement of the wipers.

44. In a machine for shaping stitchdown uppers over lasts, the combination with end wipers for wiping the upper heightwise of the last and bringing the outwardly flanged margin of the upper into contact with the cement treated margin of an extension sole, of a member for locating the sole by engagement with its edge face, said member being characterized by a flange extending inwardly over the cement treated margin of the sole to prevent contact of the lasting margin of the upper with the cement treated margin of the sole during the wiping operation.

45. In a machine for shaping stitchdown uppers over lasts, the combination with a member for supporting an extension sole and a last with an upper thereon arranged in generally upright position on the sole, and a plurality of wipers for wiping the upper heightwise of the last and for bringing the outwardly flanged margin of the upper into contact with the cement treated margin of the extension sole, of a plurality of fingers constructed and arranged to position the forepart of the last widthwise thereof relatively to the sole and to hold the lasting margin of the upper out of contact with the margin of the sole during the wiping operation.

46. In a machine for shaping stitchdown uppers over lasts, the combination with a plate for supporting an extension sole having cement applied to the margin of its last facing surface and a last having an upper mounted thereon, and a wiper for wiping the upper heightwise of the last, of a pin mounted in and upstanding from the plate, said pin being constructed and arranged to hold the upper out of contact with the cement treated margin of the sole during the wiping operation.

47. In a machine for shaping stitchdown uppers over lasts, the combination with a plate for supporting an extension sole having cement applied to the margin of its last facing surface and a last having an upper mounted thereon, of a wiper for wiping the upper heightwise of the last, a pin mounted in and upstanding from the plate, said pin being constructed and arranged to hold the upper out of contact with the cement treated margin of the sole during the wiping operation, and means mounting the pin for yielding movement heightwise of the last during the lasting operation.

48. In a machine for shaping shoe uppers over lasts, means for supporting a last and a shoe upper mounted thereon, an upper tensioning gripper, a carrier for the gripper, a first piston for actuating the carrier to advance the gripper generally heightwise of the upper from a position remote from the upper and the last into upper engaging position, a second piston for closing the gripper on the lasting margin of the upper, and means for effecting relative movement of the work supporting means and the gripper thereby to cause the application of tension to the upper.

49. In a machine for shaping shoe uppers over lasts, a work support for mounting in generally upright position a last and a shoe upper thereon, an upper shaping gripper, a carrier for the gripper, a first piston for actuating the carrier to advance the gripper from a remote position into upper engaging position, a second piston for closing the gripper on the lasting margin of the upper, and means for moving the work support heightwise of the upper after closing the gripper thereby to cause the application of tension to the upper.

50. In a machine for shaping shoe uppers over lasts, a work support for mounting in generally upright position a last and a shoe upper thereon, a gripper for tensioning the upper over the last, a carrier for the gripper, a piston for actuating the carrier to advance the gripper from a remote position into upper engaging position, a piston mounted in the carrier and constructed and arranged to close the gripper on the upper, and means for effecting relative movement of the work support and the gripper to cause the application of tension to the upper.

51. In a machine for shaping shoe uppers over lasts, the combination with a support for a last and a shoe upper thereon, of a gripper constructed and arranged to engage the lasting margin of the upper, a carrier for the gripper, a piston for advancing the carrier, means mounting the piston and the carrier for movement in a path extending generally heightwise of the upper, means for arresting the advancement of the carrier with the gripper in upper engaging position, a piston mounted in the carrier and constructed and arranged to close the gripper on the upper, and means for effecting relative movement of the gripper and the work support to cause the upper to be tensioned over the last.

52. In a machine for shaping shoe uppers over lasts, the combination with a support for a last and an upper thereon, of a gripper constructed and arranged to engage the lasting margin of a shoe upper, a slide on which the gripper is mounted, a member for mounting the slide, a piston for actuating the slide to advance the gripper from a remote position into upper engaging position, a flange on the slide constructed and arranged to abut the member thereby to determine the upper engaging position of the gripper, a piston mounted in the slide and constructed and arranged to close the gripper on the upper, and means for causing relative movement of the last support and the gripper to cause the upper to be tensioned over the last.

53. In a machine for shaping shoe uppers over lasts, the combination with a gripper for tensioning an upper over a last, of a support for the last comprising a plate having the general shape of a last bottom, said plate being characterized by the provision therein of a notch having side walls and an end wall, said notch being arranged to provide clearance for the operation of the gripper and a notch closing member pivotally mounted between the side walls of the notch, said member having an abutment surface constructed and arranged to engage the end wall of the notch thereby to determine the notch closing position of said member.

54. In a machine for shaping shoe uppers over lasts, the combination with a gripper for tensioning an upper over a last, of a plate for mounting a last in generally upright position, means mounting the plate for movement heightwise of the last, said plate being characterized by the provision therein of a notch having side walls and an end wall, said notch being arranged to provide clearance for the operation of the gripper, a notch closing member pivotally mounted between the side walls of the notch, said member having an abutment surface constructed and arranged to engage the end wall of the notch thereby to determine the notch closing position of said member, and means for actuating the notch closing member first to advance it into notch closing position and thereafter to move the notch closing member and the plate as a unit heightwise of the last.

55. In a machine for shaping shoe uppers over lasts, the combination with a support for an extension sole and a last having an upper assembled thereon, of a head, means mounted in the head for determining the location of the sole by engagement with its edge face, and lasting wipers mounted in the head and constructed and arranged to wipe the upper heightwise of the last and to bring the outwardly flanged bottom margin of the upper into contact with the margin of the sole.

56. In a machine for shaping stitchdown uppers over lasts, the combination with a support for an extension sole and a last having an upper assembled thereon, of a head, a plate mounted in the head and having an edge face against which a sole on the support is located, said plate being characterized by a margin extending inwardly over the margin of the sole, and a pair of wipers mounted in the head and constructed and arranged to wipe the upper heightwise of the last and to bring the outwardly flanged margin of the upper into contact with the margin of the sole.

57. In a machine for shaping stitchdown uppers over lasts, the combination with a support for an extension sole and a last having an upper assembled thereon, of a head, a plate mounted in the head and having an edge face against which a sole on the support is located, said plate being characterized by a margin extending inwardly over the margin of the sole, a pair of wipers mounted in the head and constructed and arranged to wipe the upper heightwise of the last and to bring the outwardly flanged margin of the upper into contact with the margin of the sole, and means for retracting the plate to permit contact of the outwardly flanged margin of the upper with the margin of the sole.

58. In a machine for shaping stitchdown uppers over lasts, a side wiper assembly comprising a plurality of wiper plates mounted on edge and arranged in mutually contiguous relation, and a plurality of end wiper plates constructed and arranged to receive a portion of the side wiper plates in overlying relation.

59. In a machine for shaping stitchdown uppers over lasts, a side wiper assembly comprising a plurality of wiper plates mounted on edge and arranged in mutually contiguous relation, a plurality of end wiper plates constructed and arranged to receive a portion of the side wiper plates in overlying relation, and pressure fluid actuated means for actuating both the side wiper assembly and the end wiper plates.

60. In a machine for shaping stitchdown uppers over lasts, means for supporting in generally upright position an extension sole and a last having a shoe upper assembled thereon, a side wiper assembly comprising a plurality of wiper plates mounted on edge and arranged in mutually contiguous relation, means for advancing the wiper plates inwardly into upper engaging position, means for imparting to the wiper plates an angular movement which, in conjunction with the inward movement of the wiper plates, causes the wipers to wipe the upper heightwise of the last, and a plurality of end wiper plates constructed and arranged to arrest the angular movement of a portion of the side wiper plates.

61. In a machine for shaping stitchdown uppers over lasts, means for supporting in generally upright position an extension sole and a last having a shoe upper assembled thereon, a side wiper assembly comprising a plurality of wiper plates mounted on edge and arranged in mutually contiguous relation, means for advancing the wiper plates inwardly into upper engaging position, means for imparting to the wiper plates an angular movement which, in conjunction with the inward movement of the wiper plates, causes the wipers to wipe the upper heightwise of the last, a plurality of end wiper plates constructed and arranged to arrest the angular movement of a portion of the side wiper plates, and pressure fluid actuated means for actuating the end wiper plates.

62. In a machine for shaping stitchdown uppers over lasts, means for supporting in generally upright position an extension sole and a last having a shoe upper assembled thereon, a side wiper assembly comprising a plurality of wiper plates mounted on edge and arranged in mutually contiguous relation, means for advancing the wiper plates into upper engaging position, means for imparting to the wiper plates an angular movement which, in conjunction with the inward movement of the wiper plates, causes the wipers to wipe the upper heightwise of the last, a plurality of end wiper plates constructed and arranged to arrest the angular movement of a portion of the side wiper plates, and means for imparting to the work support movement heightwise of the last relatively to the end wiper plates to cause said plates to impart to the upper a wiping action heightwise of the last.

63. In a machine for shaping uppers over lasts, a gripper constructed and arranged to engage the lasting margin at the extremity of the toe portion of the upper, a carrier for the gripper, means for adjusting the carrier to position the gripper in accordance with the size of the upper to be tensioned, means for supporting a last and an upper thereon during the tensioning operation comprising a plate characterized by a recess affording clearance for the adjustive movements of the gripper, a slide mounted in the recess, and connections between the carrier and the slide for causing the slide to move in unison with the gripper during its adjustive movements.

64. In a machine for shaping shoe uppers over lasts the combination with instrumentalities comprising a toe gripper, a side gripper and toe wiping means of a carrier for said instrumentalities and means mounting the carrier for movement in the general direction of the length of a shoe in the machine.

65. In a shoe machine the combination with a toe gripper and side grippers of a carrier for said grippers and means mounting the carrier for movement in a path extending generally lengthwise of a shoe in the machine with an inclination relatively to the longitudinal axis of the shoe.

66. In a shoe machine the combination with a toe gripper and side grippers of a carrier for said grippers and rails on which the carrier is mounted, said rails extending generally lengthwise of a shoe in the machine and lying in a plane disposed at an angle to the longitudinal axis of the shoe.

References Cited in the file of this patent

UNITED STATES PATENTS

| Number | Name | Date |
|---|---|---|
| 387,926 | Sinning et al. | Aug. 14, 1888 |
| 403,067 | Patten | May 7, 1889 |
| 436,853 | Forbes | Sept. 23, 1890 |
| 469,972 | Morey | Mar. 1, 1892 |
| 574,337 | Kotzlovsky | Dec. 29, 1896 |
| 629,476 | Stirckler | July 25, 1899 |
| 647,037 | Sellers et al. | Apr. 10, 1900 |
| 698,476 | Eder | Apr. 29, 1902 |
| 1,037,018 | Keighley | Aug. 27, 1912 |
| 1,719,653 | Denne | July 2, 1929 |
| 2,049,048 | Card | July 28, 1936 |
| 2,082,841 | Mackensen | June 8, 1937 |
| 2,108,859 | Kamborian | Feb. 22, 1938 |
| 2,228,263 | Farnum et al. | Jan. 14, 1941 |
| 2,246,748 | Miller | June 24, 1941 |
| 2,278,428 | Courchene | Apr. 7, 1942 |
| 2,423,454 | Jorgensen | July 8, 1947 |
| 2,490,897 | Butler et al. | Dec. 13, 1949 |
| 2,607,936 | Kamborian | Aug. 26, 1952 |
| 2,638,610 | Burby | May 19, 1953 |

FOREIGN PATENTS

| Number | Country | Date |
|---|---|---|
| 7,101 | Great Britain | of 1890 |
| 133,582 | Germany | Aug. 28, 1902 |
| 655,364 | Germany | Jan. 14, 1938 |